US010583354B2

(12) United States Patent
Muthyala et al.

(10) Patent No.: US 10,583,354 B2
(45) Date of Patent: Mar. 10, 2020

(54) INTERACTIVE GAME APPARATUS AND TOY CONSTRUCTION SYSTEM

(71) Applicant: LEGO A/S, Billund (DK)

(72) Inventors: Siddharth Muthyala, Vejle (DK); Mikkel Holm Jensen, Aarhus (DK); Jesper Søderberg, Galten (DK); Ditte Bruun Pedersen, Billund (DK); Michael Brorsen, Vejle (DK)

(73) Assignee: LEGO A/S (DK)

( * ) Notice: Subject to any disclaimer, the term of this patent is extended or adjusted under 35 U.S.C. 154(b) by 30 days.

(21) Appl. No.: 15/314,407

(22) PCT Filed: Jun. 3, 2015

(86) PCT No.: PCT/EP2015/062381
§ 371 (c)(1),
(2) Date: Nov. 28, 2016

(87) PCT Pub. No.: WO2015/185629
PCT Pub. Date: Dec. 10, 2015

(65) Prior Publication Data
US 2017/0189797 A1    Jul. 6, 2017

(30) Foreign Application Priority Data

Jun. 6, 2014   (DK) ................................. 2014 70336
Jun. 6, 2014   (DK) ................................. 2014 70337

(51) Int. Cl.
*A63F 13/63*         (2014.01)
*A63F 13/57*         (2014.01)
(Continued)

(52) U.S. Cl.
CPC ............ *A63F 13/213* (2014.09); *A63F 13/57* (2014.09); *A63F 13/63* (2014.09); *A63F 13/655* (2014.09);
(Continued)

(58) Field of Classification Search
CPC ...... A63H 2200/00; A63F 13/57; A63F 13/63
See application file for complete search history.

(56) References Cited

U.S. PATENT DOCUMENTS 3,005,282 A    10/1961   Christiansen
5,190,285 A     3/1993   Levy et al.
(Continued)

FOREIGN PATENT DOCUMENTS

CN       101675458 A     3/2010
EP        1271415 A1     1/2003
(Continued)

OTHER PUBLICATIONS

Danish Patent and Trademark Office's Search Report and Opinion for related application No. PA 2014 70605, dated Apr. 30, 2015.
(Continued)

*Primary Examiner* — Eugene L Kim
*Assistant Examiner* — Alyssa M Hylinski
(74) *Attorney, Agent, or Firm* — Day Pitney LLP

(57) ABSTRACT

A toy construction system comprising: a plurality of toy construction elements, each comprising one or more coupling members configured for releasably interconnecting the toy construction elements with each other; an image capturing device operable to capture one or more images of a toy construction model constructed from one or more of said toy construction elements; and a processor configured to extract a two-dimensional view of the toy construction model from the captured image; to create a virtual object in a virtual environment; and to create a three-dimensional graphical representation of the virtual object from the extracted two-dimensional view, wherein the created three-dimensional representation has a first view, seen along a first direction, defined by the extracted two-dimensional view,
(Continued)

and a size along the first direction determined from a size of the extracted two-dimensional view.

11 Claims, 11 Drawing Sheets

(51) Int. Cl.
*A63H 33/04* (2006.01)
*A63H 33/08* (2006.01)
*A63F 13/213* (2014.01)
*A63F 13/655* (2014.01)

(52) U.S. Cl.
CPC ......... *A63H 33/042* (2013.01); *A63H 33/086* (2013.01); *A63H 2200/00* (2013.01)

(56) References Cited

U.S. PATENT DOCUMENTS

| | | | |
|---|---|---|---|
| 5,766,077 A | 6/1998 | Hongo | |
| 5,853,327 A | 12/1998 | Gilboa | |
| 6,290,565 B1* | 9/2001 | Galyean, III | A63H 3/16 273/148 B |
| 6,549,933 B1 | 4/2003 | Barrett et al. | |
| 6,650,870 B2 | 11/2003 | White et al. | |
| 7,081,033 B1 | 7/2006 | Mawle et al. | |
| 7,092,988 B1 | 8/2006 | Bogatin et al. | |
| 7,439,972 B2 | 10/2008 | Timcenko | |
| 7,596,473 B2 | 9/2009 | Hansen et al. | |
| 7,639,231 B2 | 12/2009 | Parry et al. | |
| 7,843,471 B2 | 11/2010 | Doan et al. | |
| 7,993,201 B2 | 8/2011 | Matsumoto et al. | |
| 8,033,901 B2 | 10/2011 | Wood | |
| 8,257,157 B2* | 9/2012 | Polchin | A63F 13/02 463/9 |
| 8,705,845 B2 | 4/2014 | Doucet et al. | |
| 8,847,964 B2* | 9/2014 | Peterson | G06T 13/80 345/419 |
| 9,597,583 B2* | 3/2017 | Loetz | A63F 9/0278 |
| 9,761,036 B2* | 9/2017 | Rzeszotarski | G06T 13/20 |
| 2002/0196250 A1 | 12/2002 | Anderson et al. | |
| 2006/0030410 A1 | 2/2006 | Stenton et al. | |
| 2007/0063997 A1* | 3/2007 | Scherer | A63H 9/00 345/419 |
| 2008/0228450 A1 | 9/2008 | Jakobsen et al. | |
| 2008/0291216 A1 | 11/2008 | Cheng et al. | |
| 2009/0315258 A1 | 12/2009 | Wallace et al. | |
| 2010/0164953 A1 | 7/2010 | Wouhaybi et al. | |
| 2011/0028219 A1 | 2/2011 | Heatherly et al. | |
| 2011/0098092 A1 | 4/2011 | Reiche, III | |
| 2011/0164029 A1* | 7/2011 | King | G06F 3/04883 345/419 |
| 2011/0298922 A1* | 12/2011 | Horovitz | A63F 13/06 348/143 |
| 2012/0052934 A1 | 3/2012 | Maharbiz et al. | |
| 2012/0244922 A1 | 9/2012 | Horovitz | |
| 2012/0276997 A1 | 11/2012 | Chowdhary et al. | |
| 2012/0295700 A1 | 11/2012 | Reiche | |
| 2012/0295703 A1 | 11/2012 | Reiche et al. | |
| 2012/0295704 A1 | 11/2012 | Reiche et al. | |
| 2013/0083061 A1 | 4/2013 | Mishra et al. | |
| 2013/0120355 A1* | 5/2013 | Joshi | G06T 17/10 345/419 |
| 2013/0196766 A1 | 8/2013 | Leyland et al. | |
| 2013/0217295 A1 | 8/2013 | Karunaratne | |
| 2013/0225296 A1 | 8/2013 | Kim | |
| 2013/0231193 A1 | 9/2013 | Heatherly et al. | |
| 2013/0288563 A1 | 10/2013 | Zheng et al. | |
| 2014/0002493 A1 | 1/2014 | Mitchell et al. | |
| 2014/0015813 A1 | 1/2014 | Numaguchi et al. | |
| 2014/0015832 A1 | 1/2014 | Kozko et al. | |
| 2014/0055445 A1* | 2/2014 | Cook | G06T 17/00 345/419 |
| 2014/0057527 A1 | 2/2014 | Fessenmaier | |
| 2014/0121008 A1 | 5/2014 | Canessa | |
| 2014/0162785 A1 | 6/2014 | Reiche et al. | |
| 2014/0171201 A1 | 6/2014 | May et al. | |
| 2014/0179446 A1 | 6/2014 | Zuniga et al. | |
| 2014/0197991 A1 | 7/2014 | Mkrtchyan et al. | |
| 2014/0364240 A1 | 12/2014 | Leyland | |
| 2015/0042757 A1 | 2/2015 | Goodman et al. | |
| 2015/0151212 A1 | 6/2015 | Akavia et al. | |
| 2016/0193537 A1* | 7/2016 | May | A63F 13/213 463/31 |

FOREIGN PATENT DOCUMENTS

| | | |
|---|---|---|
| EP | 1 776 990 A2 | 4/2007 |
| EP | 2 317 720 A1 | 5/2011 |
| GB | 2 330 540 A | 4/1999 |
| GB | 2365796 A | 2/2002 |
| JP | H0947575 A | 2/1997 |
| JP | 2003135847 A | 5/2003 |
| JP | 2006068140 A | 3/2006 |
| JP | 2008104771 A | 5/2008 |
| JP | 2009247375 A | 10/2009 |
| JP | 2011234971 A | 11/2011 |
| WO | 1998/040815 A2 | 9/1998 |
| WO | 2004034333 A1 | 4/2004 |
| WO | 2004/101095 A1 | 11/2004 |
| WO | 2004104811 A2 | 12/2004 |
| WO | 2011017393 A1 | 2/2011 |
| WO | 2012/158836 A2 | 11/2012 |
| WO | 2012160055 A1 | 11/2012 |
| WO | 2013186769 A1 | 12/2013 |
| WO | 2014/093247 A1 | 6/2014 |
| WO | 2014100230 A1 | 6/2014 |
| WO | 2015/185629 A2 | 12/2015 |
| WO | 2013183328 A1 | 1/2016 |

OTHER PUBLICATIONS

Danish Patent and Trademark Office's Search Report and Opinion for corresponding for application No. PA 2014 70336, dated Dec. 16, 2014.
Danish Patent Office's Search Report for DK priority application No. PA 2014 70336, dated Dec. 4, 2014.
Danish Patent Office's Search Report for DK priority application No. PA 2014 70337, dated Dec. 3, 2014.
International Search Report issued in corresponding international application No. PCT/EP2015/062381, dated Feb. 19, 2016.
Written Opinion issued in corresponding international application No. PCT/EP2015/062381, dated Feb. 19, 2016.
International Preliminary Report on Patentability in corresponding international application No. PCT/EP2015/062381, dated Oct. 11, 2016, together with amended sheets of claims, filed on Mar. 17, 2016 and Sep. 21, 2016.
Miller et al., "Interactive 3D Model Acquisition and Tracking of Building Block Structures", IEEE Transactions on Visualization and Computer Graphics, 18:4, Apr. 1, 2012.
Smith, "Bricksmith—virtual Lego modeling for your Macintosh", May 27, 2014. Retrieved from internet: Sep. 15, 2015: URL:<https://web.archive.org/web/20140527114446/http://bricksmith.sourceforge.net>.
International Search Report, issued in related application No. PCT/EP2015/072394, dated Jan. 5, 2016.
Written Opinion of the International Search Authority, issued in related application No. PCT/EP2015/072394, dated Jan. 5, 2016.
Notification of Transmittal with International Preliminary Report on Patentability, issued in related application No. PCT/EP2015/072394, dated Dec. 21, 2016.
USPTO's Non-Final Office Action issued in related U.S. Appl. No. 15/515,229, dated Dec. 4, 2018.
First Office Action issued in related Chinese application No. 201580063744.0, dated Mar. 4, 2019.
Original Notice of Reasons for Refusal issued in related Japanese Patent Application No. 2017-518077, dated Sep. 20, 2019.

(56) References Cited

OTHER PUBLICATIONS

English language Translation of Notice of Reasons for Refusal issued in related Japanese Patent Application No. 2017-518077, dated Sep. 20, 2019.
Final Office Action issued in related U.S. Appl. No. 15/515,229, dated Jul. 26, 2019.

* cited by examiner

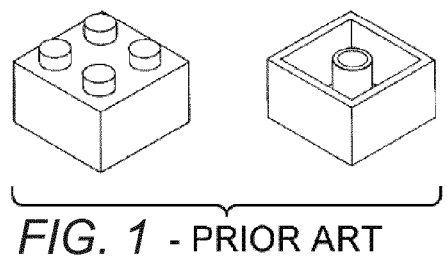
FIG. 1 - PRIOR ART
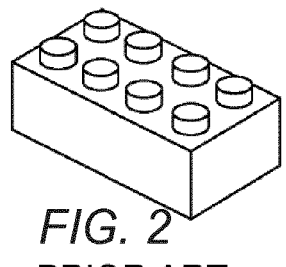
FIG. 2
PRIOR ART
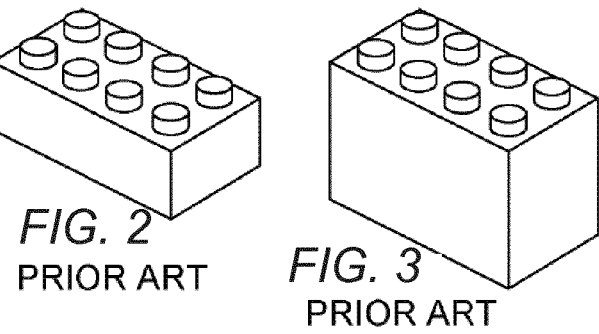
FIG. 3
PRIOR ART
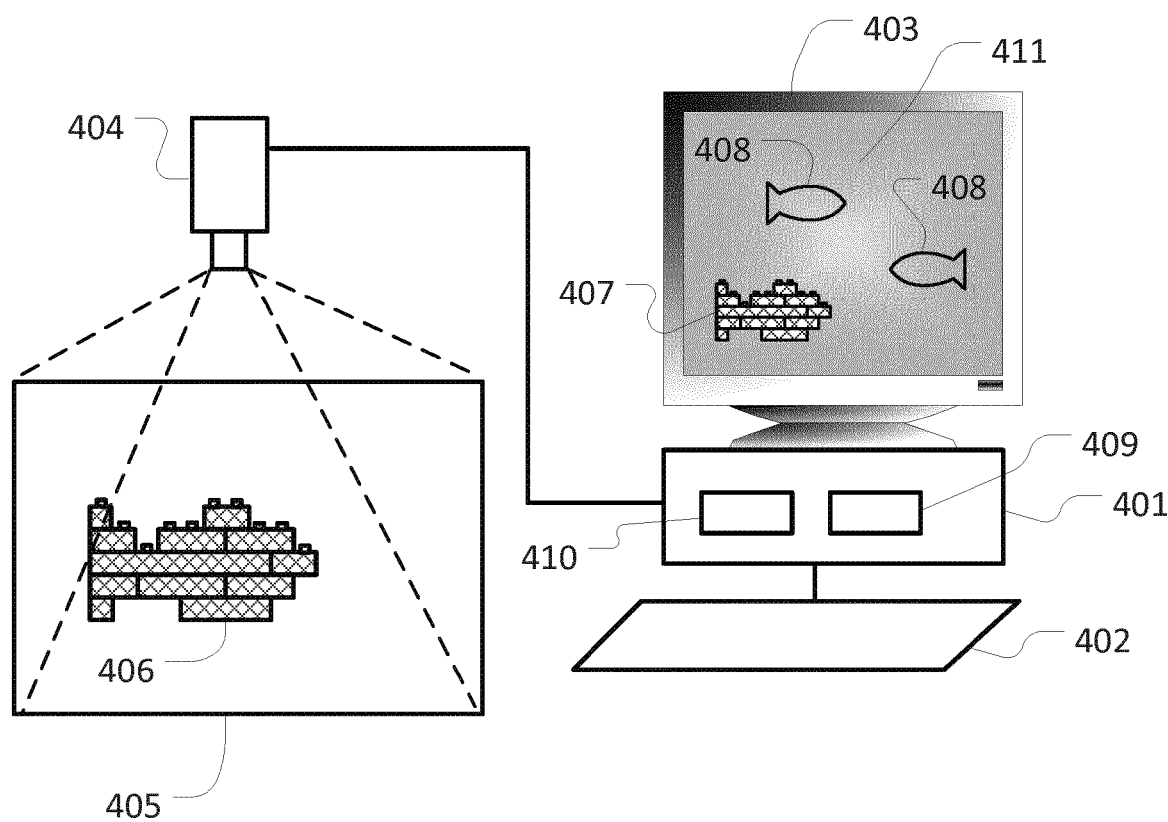
FIG. 4

INTERACTIVE GAME APPARATUS AND TOY CONSTRUCTION SYSTEM

CROSS-REFERENCE TO RELATED APPLICATIONS

This application is a U.S. National Stage of International Application No. PCT/EP2015/062381, filed on 3 Jun. 2015 and published on 10 Dec. 2015, as WO 2015/185629 A2, which claims the benefit of priority to Danish Patent Application Nos. PA 2014 70336 and PA 2014 70337, both filed on 6 Jun. 2014.

FIELD OF THE INVENTION

The invention relates to toy construction systems comprising toy construction elements having coupling members for releasably interconnecting the toy construction elements with each other.

BACKGROUND

Such toy construction systems have been known for decades. Over the years, simple box-shaped building blocks have been supplemented with other construction elements with either a specific appearance or a mechanical or electrical function to enhance the play value. Such functions include e.g. motors, switches and lamps, but also programmable processors that accept input from sensors and can activate function elements in response to received sensor inputs.

Several attempts have been made to control virtual game play by means of physical toys.

For example, US 2011/298922 discloses a system for extracting an image of a physical object. The extracted image can be digitally represented on a display device as part of a virtual world, or video game, where the objects inhibiting the virtual world and/or video game, were designed and built from the construction set in the real-world. However, in many video games or other virtual environments it is desirable to provide three-dimensional virtual objects.

According to at least one aspect, it is thus desirable to provide a process for creating three-dimensional virtual objects from physical toy construction models in a user-friendly manner. In particular, it is desirable to provide such a method in which the user is not required to go through a large number of steps to configure and modify the resulting virtual object, i.e. where the creation of the virtual object is performed in a highly automated fashion, requiring only little user interaction.

For example GB 2 365 796 discloses a game system that comprises a toy which stores toy information, a reader for detecting the toy information by a contact-less data transmission system, and a game device. The game device executes a game in which a character representing the toy appears. The toy is able to store play information about the game inputted by data transmission which is then used in the game device when the game is executed. The play information may change an attribute of the character, an action of the character, the shape of the character or a scene of the game.

U.S. Pat. No. 6,290,565 discloses a three dimensional physical toy that can be manipulated by a user and that is connected to a computer. Interchangeable accessory parts can be plugged into the toy via mechanisms which identify the accessory parts immediately when they are plugged into the toy body. A software program running in the computer displays a graphical character representation of the toy, including the accessory parts that have been plugged into the toy in a virtual environment on a monitor screen. The toy and the accessory parts interact dynamically with the software program so that the graphical character representation of the toy appears on the screen exactly as it physically appears to the user. As various accessory parts are inserted into, or removed from, the toy, the graphical character representation of the toy interacts with the virtual environment in different ways.

However, the above prior art systems require a communications interface between the toy and a computer system. Moreover, the above prior art toys are relatively complicated and include electronic components or even a memory and a communications interface.

Also, the degree of freedom when building the toy from accessory parts is limited to a specific main body of the toy and position of electrical connectors.

It is generally desirable to provide a toy construction system that enhances the educational and/or play value of the system. It is also desirable to provide a toy construction system wherein a set of construction elements may easily be used in different toy construction models and/or in combination with existing toy construction elements. Moreover it is desirable to provide a toy construction system that allows users, in particular children, to construct multiple toy models in a user-friendly, efficient, yet flexible and reliable manner. In particular, it is desirable to provide a toy construction system that allows a user-friendly and flexible manner of creating virtual objects in a virtual environment such as a game system.

SUMMARY

According to a first aspect, disclosed herein is a toy construction system comprising:

a plurality of toy construction elements, each comprising one or more coupling members configured for releasably interconnecting the toy construction elements with each other;

an image capturing device operable to capture one or more images of a toy construction model constructed from one or more of said toy construction elements; and a processor configured
to extract a two-dimensional view of the toy construction model from the captured image;
to create a virtual object in a virtual environment; and
to create a three-dimensional graphical representation of the virtual object from the extracted two-dimensional view, wherein the created three-dimensional representation has a first view, seen along a first direction, defined by the extracted two-dimensional view, and a size along the first direction determined from a size of the extracted two-dimensional view.

Consequently, a simple, captured image of the physical toy construction model may be used as a basis for generating a virtual object having a user-defined three-dimensional graphical representation. The user does not need to obtain images from multiple viewpoints; in fact, the user only needs to construct a toy construction model that represents one view of the desired virtual object from one direction. Based on the captured image, the process may then automatically create a virtual object including its three-dimensional graphical representation.

Even though only a single image is required as a basis for the creation of the virtual object, it will be appreciated that, in some embodiments, the process may use multiple images as an input. The two-dimensional view may represent a view from any direction, e.g. a side view, a front view or a top view.

In some embodiments, the three-dimensional representation is created by a simulated extrusion of a virtual object along the first direction such that the object has a cross sectional shape—e.g. in a plane normal to the first direction—which cross-sectional shape has a periphery defined by a periphery of extracted two-dimensional view. For example, the extracted two-dimensional view may be a front view of the toy construction model having a width and a height, and the process may create a three-dimensional graphical representation as a simulated extruded object having a cross section defined by the two-dimensional view and having a depth computed from the width and/or the height of the detected front view. For example, the depth may be computed to be equal to the width or the height.

The two-dimensional view defines a plane. The size of the two-dimensional view may be a measure of a linear extent of the two-dimensional view. In particular, a second and a third direction may be defined in the plane; the third direction may be normal to the second direction. A size of the two-dimensional view measured as a linear extent of the two-dimensional view along the second direction. For example, the extent along the second direction may be a width of the two-dimensional view and the extent along the third direction may be a height of the two-dimensional view. The extent along the second direction may vary when moving along the third direction. Accordingly, the size of the two-dimensional view may be measured as the linear extent along the second direction at a predetermined position along the third direction. For example, the size may be measured as the width of a side view of an object, measured at a base of the object. Alternatively, the size may be defined as an average extent along the second direction, averaged along the third direction. Yet alternatively, the size may be measured as a maximum linear extent along the second direction. Yet alternatively, the size may be defined as a geometric or arithmetic average of the linear extents along the second and third direction or as another parameter of the two-dimensional view.

In some embodiments, the linear extent of the created graphical representation along the first direction may be equal to the linear extent of the two-dimensional view along the second direction or otherwise derived from the linear extent of the two-dimensional view along the second direction. The linear extent of the two-dimensional view, measured along the second direction, may vary depending on which position along the third direction the linear extent is measured. Accordingly, the linear extent of the created three-dimensional graphical representation along the first direction may vary along the third direction as well, or it may be constant. For example, in one embodiment, the linear extent along the first direction may be constant for different positions along the third direction if the corresponding linear extent of the two-dimensional view along the second direction varies continuously or less than a predetermined threshold, when moving along the third direction. When the linear extent of the two-dimensional view along the second direction changes abruptly when moving along the third direction, the linear extent of the created graphical representation may change accordingly. For example, when the two-dimensional view represents a front view of an object, the front view having a width and a height, the width of the front view may be different at different heights. For example, the front view may comprise a first part having a first width and a second part having a second width. The process may thus create the three-dimensional representation to have a varying depth matching the varying width of the front view. In the above example, the process may create the three-dimensional graphical representation with the first part having a first depth matching the first width, and the second part having a second depth matching the second width. Consequently, the user may create rather complex three-dimensional shapes in a simple manner. The process may selectively create the three-dimensional graphical representation with a constant or with a varying size along the first direction, e.g. based on one or more decision rules, such as responsive to the degree of variation of the corresponding linear extent of the extracted two-dimensional view and/or responsive to a corresponding change in another feature (other than the linear extent) of the two-dimensional view such as a corresponding change in colour and/or texture.

The circumferential surface of the simulated extruded shape may have a predetermined colour and/or a predetermined texture. Alternatively the circumferential surface may have a colour and/or texture determined by a colour/texture of the two-dimensional shape. For example, the colour and/or texture of each portion of an edge of the two-dimensional view may determine the colour/texture of the corresponding portion of the circumferential surface.

In some embodiments, the process may add additional features to the circumferential surface. For example, when the virtual object represents a house, the process may add one or more windows and/or one or more doors to the circumferential surface. The type, number, size and/or position of the added features may be predetermined, selected randomly, and/or determined, at least in part, by the corresponding type, number, size and/or position of corresponding features of the extracted two-dimensional view. To this end, the process may perform a feature-detection process of the extracted two-dimensional view so as to detect any such features within the two-dimensional view.

In some embodiments, the processor is further adapted to
  determine, from the captured one or more images, one
  or more visual attribute parameters, each indicative of
  a respective visual attribute derivable from one or more
  of a colour, a shape and a size of the toy construction
  model; and to control the virtual object in the virtual
  environment to have a behaviour based on the determined one or more visual attribute parameters.

As will be described in more detail with reference to a second aspect of the present disclosure, the visual attribute may be any property of the toy construction model that can be attained by sight and be derived from a colour and/or a shape and/or a size of the toy construction model. Consequently, a user may create a physical toy construction model resembling an object to be used as a virtual object in a computer-generated virtual environment. As the user may construct these objects from toy construction elements, the user has a large degree of freedom as to how the object is constructed. Moreover, the system provides the user with a flexible, yet easy-to understand and easy-to use mechanism for influencing the desired virtual properties of a virtual object in the virtual environment, e.g. game-related attributes of virtual object.

According to a second aspect, disclosed herein is a toy construction system comprising:
  a plurality of toy construction elements, each comprising one or more coupling members configured for releasably interconnecting the toy construction elements with each other;

an image capturing device operable to capture one or more images of a toy construction model constructed from one or more of said toy construction elements; and a processor configured to determine, from the captured one or more images, one or more visual attribute parameters, each indicative of a respective visual attribute derivable from one or more of a colour, a shape and a size of the toy construction model;

to create a virtual object in a virtual environment; and to control the virtual object in the virtual environment to have a behaviour based on the determined one or more visual attribute parameters.

The visual attribute may be any property of the toy construction model that can be attained by sight and be derived from a colour and/or a shape and/or a size of the toy construction model.

Consequently, a simple, captured image of the physical toy construction model may be used as a basis for generating a virtual object having a user-defined behaviour in the virtual environment. A user may create a physical toy construction model resembling an object to be used as a virtual object in a computer-generated virtual environment. As the user may construct these objects from toy construction elements, the user has a large degree of freedom as to how the object is constructed. Moreover, the system provides the user with a flexible, yet easy-to understand and easy-to use mechanism for influencing the desired behaviour or other attributes of the virtual object in the virtual environment, e.g. behavioural attributes such as capabilities, needs, preferences or other attributes of the virtual object, or other game-related attributes of a virtual object.

The construction elements of the system may each have a color, shape and/or size selected from a predetermined set of colors, shapes and/or sizes, i.e. the toy construction system may only comprise toy construction elements of a limited, predetermined range of predetermined colors, shapes and/or sizes. The determined visual attribute is at least partly, if not completely, defined by the colors, shapes and sizes of the shapes of the toy construction elements as well as their relative positions and orientations within the constructed toy construction model. Hence, while a toy construction system may provide a large number of building options and allows constructing a vast variety of toy construction models, the degrees of freedom of constructing toy construction models are restricted by the properties of the individual toy construction elements and by the construction rules imposed by the toy construction system. For example, the colors of a toy construction model are limited to the set of colors of the individual toy construction elements. Each toy construction model has a shape and size that is at least in part defined by the shapes and sizes of the individual toy construction elements and by the ways they can be interconnected.

Hence, the visual attributes of the toy construction model are that may be determined by the processor are determined from a set of predetermined visual attributes. Accordingly, the behavioural attributes of the created virtual object may in some embodiments only be created from a set of predetermined behavioural attributes corresponding to the set of predetermined visual attributes consistent with the toy construction system.

In some embodiments, the process extracts a two-dimensional view and creates a three-dimensional virtual object from the extracted two-dimensional view. In particular, the extracted two-dimensional view may define a size of the two-dimensional view in a direction with the plane defined by the two-dimensional shape, and the process may create the three-dimensional object to have a first face having the detected two dimensional shape and having a dimension in a direction normal to said first face determined responsive to the size of the two-dimensional view.

For example the process may create the three-dimensional object as simulated extrusion of an object in a direction of extrusion, where the extruded object has a cross sectional shape (e.g. in the plane normal to the direction of extrusion) defined by the extracted two-dimensional view.

For example, the extracted two-dimensional view may be a side view of the object having a width and a height, and the process may created a three-dimensional virtual object as a simulated extruded object having a cross section defined by the two-dimensional side view and having a depth computed from the width and/or the height of the extracted side view. For example, the depth may be computed to be equal to the width or the height.

The various aspects described herein may be implemented with a variety of computer-generated virtual environments in which virtual objects are controlled by a data processing system to exhibit a behaviour within the virtual environment and/or where a virtual object has associated attributes that influence the game-play of a videogame or other evolution of a virtual environment.

Generally, a virtual object may represent a virtual character such as a human-like character, an animal-like character, a fantasy creature, etc. Alternatively, a virtual object may be an inanimate object, such as a building, a vehicle, a plant, a weapon, etc. In some embodiments, virtual objects whose counterparts in the physical world are inanimate, e.g. a car, may be used as an animate virtual character in a virtual environment. Hence, in some embodiments the virtual object is a virtual character and, in some embodiments, the virtual object is an inanimate object.

A virtual character may exhibit behaviour by moving around within the virtual environment, by interacting with or generally engaging other virtual characters and/or with inanimate virtual objects present in the virtual environment and/or with the virtual environment itself and/or by otherwise developing within the virtual environment, e.g. growing, aging, developing or loosing capabilities, attributes or the like. Generally, virtual objects may have attributes, e.g. a capability, that influence the game play or other evolution of a virtual environment. For example, a car may have a certain maximum speed, or an object may have an attribute that determines whether or how a virtual character may interact with the virtual object, and/or the like.

Hence, a computer-generated virtual environment may be implemented by a computer program executed on a data processing system and causing the data processing system to generate a virtual environment and to simulate the evolution of the virtual environment over time, including the behaviour of one or more virtual characters and/or the attributes of one or more virtual objects within the virtual environment. For the purpose of the present description a computer-generated virtual environment may be persistent, i.e. it may continue to evolve and exist even when no user interacts with it, e.g. between user sessions. In alternative embodiments, the virtual environment may only evolve as long as a user interacts with it, e.g. only during an active user session. A virtual object may be at least partly user-controlled, i.e. the data processing system may control the behaviour of a virtual object at least partly based on received user inputs. A computer-generated virtual environment may be a single-user environment or a multi-user environment. In a multi-user environment more than one user may interact with the virtual environment concurrently, e.g. by controlling respective virtual characters or other virtual objects in the virtual environment. Computer-generated virtual environments and, in particular, persistent, multi-user environments are sometimes also referred to as virtual worlds. Computer-generated virtual environments are frequently used in game systems, where a user may control one or more virtual characters within the virtual environment. A virtual character controlled by the user is sometimes also referred to as "the player." It will be appreciated that the at least some embodiments of the aspects described herein may also be used in contexts other than game play. Examples of computer-generated virtual environments may include but are not limited to videogames, e.g. games of skill, adventure games, action games, real-time strategy games, role play games, simulation games, etc. or combinations thereof.

The system may present a representation of the virtual environment including a representation of one or more virtual objects such as virtual characters within the virtual environment, and including the evolution of the environment and/or virtual object over time. The virtual environment and/or the virtual objects may be presented as two or three-dimensional graphical representations on a display of the data processing system. A user may access a computer-generated virtual environment so as to view the graphical presentation and/or so as to interact with the computer-generated virtual environment. For example, the computer-generated virtual environment may present perceptual stimuli to the user, who in turn can manipulate elements of the virtual environment. Such computer-generated virtual environments may be simulated based on a set of rules which may draw from the reality or from fantasy worlds. Example rules are gravity, topography, simulated dynamics of physical objects, locomotion, simulated ecosystems, etc.

The image capturing device may comprise one or more sensors that detect light or other forms of electromagnetic radiation or audible or inaudible sound, such as light or other electromagnetic radiation or sound reflected by an object in a field of view of the image capturing device. The image capturing device may comprise an array of sensors, such as a CCD chip, or a single sensor that is operable to scan across a field of view, or a combination of a number of sensors that are scanned. Hence, the toy construction model may be passive in that it does not need to actively emit any sound, light, radio-signals, electrical signals, or the like. Moreover, the image may be captured in a contactless fashion without the establishment of any electrical contact, communications interface or the like.

The image capturing device may comprise a radiation source and/or a sound source operable to direct radiation and/or sound waves towards the toy construction model. For example, the image-capturing device may comprise a flash-light, one or more LEDs, a laser, an ultrasound transducer, and/or the like. Alternatively, the image capturing device may be operable to detect ambient radiation or sound reflected by the object. Here, the term reflection is intended to refer to any type of passive emission responsive to received radiation or waves, including diffuse reflection, refraction, etc.

The image may be a picture or another form of two-dimensional representation of a field of view of the image capturing device which representation allows the determination of a shape and/or colour and/or size of an object within the field of view. For example, the image capturing device may comprise a digital camera responsive to visible light, to infrared light, and/or the like. In some embodiments, the camera may be a 3D camera operable to also detect distance information of respective points within the field of view relative to the camera position. Another example of an image capturing device may comprise an ultrasound scanner, a laser scanner or the like, which may be operable to obtain a 2D distance map of respective distances from the image capturing device of respective surface points within the field of view of the image capturing device. Accordingly, the image may comprise a 2D array of pixels or other array elements, each array element representing sensed information associated with a point or direction within the field of view. The sensed information may include an intensity of a received radiation or wave, a frequency/wavelength of the received radiation or wave, a distance map, and/or other suitable sensed quantity.

Determining one or more visual attribute parameters may comprise processing the captured image to extract a view of the toy construction model within the captured image, e.g. a two-dimensional view, and determining the visual attribute parameter as a visual attribute parameter of the extracted view of the toy construction model. The extracted view may be a geometric shape of the toy construction model within the one or more captured images which object represents the toy construction model. The extracted view may thus comprise a view of the toy construction model where any background and/or other image features have been detected and digitally removed. Determining the visual attribute parameter may comprise computing a geometric property of the extracted view of the toy construction model indicative of a size and/or a shape of the extracted view of the toy construction model, such as a length of a perimeter delimiting the extracted view of the toy construction model against a background, an area of the extracted view of the toy construction model within the captured image, one or more sizes of the extracted view of the toy construction model along respective axes one or more angles relative to detected edges or planes, etc.

Determining the visual attribute parameter may further comprise computing the visual attribute parameter from one or more of the computed geometric properties, such as an aspect ratio, a ratio between an area and a perimeter of the extracted view of the toy construction model, e.g. of the shape of the extracted view of the toy construction model, a measure of connectedness of different parts of the extracted view.

Alternatively or additionally, determining the visual attribute parameter may comprise detecting one or more colours of the extracted view of the toy construction model, e.g. a dominating colour, a combination of colours, and/or the like. A dominating colour may be detected as a colour associated with a largest portion of the area of the extracted view of the toy construction model within the captured image.

Embodiments of the system described herein thus allow the user to control virtual attributes of a virtual object, such as behavioural attributes of a virtual character, without the need for advanced programming skills or understanding of complicated rules of behaviour programming. The system allows implementation of intuitive rules which, at the same time, provide the user with a large degree of freedom when creating virtual characters and/or inanimate virtual objects. The system allows a user to program the behaviour of a virtual object my physically constructing a real-world object from construction elements of a toy construction system and within the rules and limitations imposed by the toy construction system.

Controlling the behaviour of a virtual object may comprise defining one or more virtual attributes each associated with a behavioural characteristic of the virtual object; and setting a value of the virtual attribute based on the determined visual attribute parameter. The processor may further be adapted to control the behaviour of the virtual object based on the set value of the virtual attribute and one or more behaviour simulation rules. Similarly, controlling the behaviour of an inanimate object may comprise defining one or more virtual attributes associated with a characteristic of the inanimate virtual object, e.g. a capability, usability, responsiveness to certain interactions, etc.

Generally, in some embodiments, at least one of the visual attribute parameters is indicative of a quantifiable parameter reflecting a degree or quantity within a range of possible values; setting the value of the virtual attribute may thus comprise selecting one of a plurality of parameter values as a function of the determined visual attribute parameter. In some embodiments, the virtual attribute is selected from a set or range of virtual attribute values, e.g. reflecting respective degrees of a behavioural attribute, such as a degree of energy, skill, of a mood, etc. Hence, rather than merely detecting a presence or absence of a predetermined feature, the determination of the behaviour of the virtual object is based on the determined one or more visual attribute parameters. Consequently, an increased flexibility is provided to the user and a mechanism for providing inputs reflecting grades of behavioural patterns.

For example, the virtual attribute may be indicative of a speed of movement of the virtual object in the virtual environment. For example, the processor may map the detected size of the detected toy construction model into a maximum speed of a corresponding virtual object. Alternatively or additionally, the processor may map the detected aspect ratio of the detected toy construction model onto a maximum speed of a corresponding virtual object. For example elongated toy construction models (having an aspect ratio much larger or much smaller than 1) may result in the creation of an elongated virtual object that carries a maximum speed attribute indicating a high maximum speed. Another example of a virtual attribute may reflect one or more behavioural patterns of an autonomous or semi-autonomous character, such as a level of fear, aggressiveness, shyness, friendliness and/or the like. For example, a red toy construction model may result in an "aggressive" virtual character, etc. Another example of a virtual attribute may reflect one or more needs or preferences of an autonomous or semi-autonomous character, such as an amount of resources (such as food, space) and/or type of resources (such as type of food). In yet another example, the virtual attribute may reflect a maximum acceleration of a vehicle, the manoeuvrability or traction of a vehicle, the resistance of an object against damage, the capability of a house to house an inhabitant or an inhabitant of a certain size, an inhabitant with certain needs, an inhabitant of a certain type, a certain number of inhabitants, etc.

The processor may create the virtual object such that the virtual object resembles the toy construction model and, in particular to have a shape and/or size and/or colour resembling or even substantially identical the toy construction model. In particular, the processor may be configured to detect a shape of the toy construction model and to create the virtual object to have a shape similar or even equal to the detected shape. Alternatively or additionally, the processor may be configured to detect a colour of the toy construction model and to create the virtual object to have a colour based on the detected colour.

In some embodiments, the process creates a graphical representation of the virtual object, such as a three-dimensional graphical representation. In some embodiments, the process creates a data structure comprising a surface representation of the virtual object for drawing the object. Hence, in some embodiments, creating the graphical representation of the virtual object includes creating a data structure comprising a surface representation of the virtual object for drawing the object. If movements of the virtual object are to be animated in the virtual environment, creating the graphical representation of the virtual object further include creating a data structure representing a skeleton of bones for animating the virtual object. Creating may thus comprise creating the surface representation to have a shape and/or size/and/or colour based on the detected shape and/or size and/or colour of the toy construction model and creating the skeleton to have a shape and size based on the detected shape and/or size of the toy construction model. For example, creating the skeleton may comprise selecting one of a set of skeleton templates and a scaling the skeleton template based on the detected size and shape of the toy construction model; in some embodiments, a single template may suffice. For example the template skeleton may be defined such that the virtual object is animated so as to resemble a certain type of figure, such as a human-like figure having arms and legs and being animated to resemble a walking figure, or an animal having four legs, or a bird having wings and performing a flying movement, or a fish or snake-like figure being animated to perform a swimming or gliding movement. Selecting a skeleton template may be performed automatically, e.g. based on the detected shape of the toy construction model, and/or based on a user selection, e.g. a selection of the type of character to be created, such as a fish, a snake, a four-legged animal, etc.

Generally, a virtual object may be an animate or an inanimate object. The virtual object may be a completely autonomous object or an object whose actions and/or behaviour are partly or completely responsive to user inputs. A virtual object may be an inanimate object such as a building, a vehicle, a weapon or other accessory or equipment, etc. A virtual object may be stationary or movable within the virtual environment. For example, an object may be carried, worn or otherwise moved by a virtual character and/or controlled to be moved by the user, e.g. a car or other vehicle being controlled in a car racing game. A virtual object may comprise movable parts, such as doors, or the like and/or other modifiable parts.

In some embodiments, the processor is configured to create an inanimate virtual object in the virtual environment; and to control a virtual character in the virtual environment to interact with the inanimate virtual object based on the determined one or more visual attribute parameters of the inanimate virtual object. In some embodiments, the processor may be configured to create both the virtual character and the inanimate virtual object. In such an embodiment, the virtual character may be created based on a previously or subsequently captured image of another toy construction model, or based on a second object/shape detected within the same image, or the virtual character may be created based on a predetermined virtual character definition and/or based on user inputs such as a user selection. The processor may thus be configured to set one or more game-related virtual attributes of the created inanimate virtual object, each virtual attribute being indicative of an attribute of the inanimate virtual object in the virtual environment, to set a value of the virtual attribute based on the one or more determined visual attribute parameters, and to control the virtual character in the virtual environment to interact with the inanimate virtual object based on the value of the virtual attribute. For example, if the inanimate virtual object represents a food item, a virtual attribute of the food item may indicate as to whether the food item is "meat" or a "vegetable." The processor may thus set the virtual attribute of the virtual food item to either "meat" or "vegetable," e.g. depending on the detected colour of the toy construction model in the captured image. For example a red colour may correspond to meat while a green colour may correspond to vegetables. The virtual character may e.g. have a behavioural characteristic indicating that the virtual character only likes meat. Hence, when the virtual character encounters a food item in the virtual environment, the virtual character may eat the food item or not, depending on whether the food item has associated with it the attribute "meat" or not. Similarly, the detected size of the toy construction model representing a food item may be translated to a game attribute indicating a nutritional value of the corresponding virtual food item, e.g. a number of calories etc. Consequently, the system provides a mechanism that allows a user to not only influence the behavioural characteristics of the virtual characters directly, but also to influence their behaviour by providing different simulated stimuli to the virtual characters in the virtual world. In some embodiments, the process may spawn another virtual object, such as a virtual character, responsive to adding the created virtual object to the virtual environment. For example, adding a created virtual object representing a house may cause the process to spawn a new virtual character as an inhabitant of the house.

The processor may further be adapted to control the behaviour of a virtual object based on one or more behaviour simulation rules and responsive to one or more virtual attributes of the virtual object and/or responsive to one or more virtual attributes of other virtual objects which the virtual object engages, e.g. responsive to the virtual object being in a predetermined proximity of another virtual object or otherwise engaging the other virtual object. Alternatively or additionally, the processor may set a value of a virtual attribute of the virtual object responsive to the virtual object engaging another virtual object and based on a virtual attribute of the other virtual object. For example, the processor may change an energy level, a strength level or another attribute of the virtual object based on an attribute of the other virtual object, e.g. a nutritional value of a food item.

In some embodiments, the system is configured to extract a view of the toy construction model as a two-dimensional geometric shape, e.g. in a captured two-dimensional image, e.g. in a single 2D digital image. In some embodiments, the system may use multiple images, e.g. images of the toy construction model taken from multiple viewpoints thus allowing a detection and extraction of a 3D geometric shape. In any event, the processor may be adapted to create a virtual character having a two-dimensional shape or a three-dimensional shape.

In some embodiments, the process creates the graphical representation such that the virtual object appears to be constructed from toy construction elements. To this end, the process may create a virtual construction model created from virtual construction elements corresponding to the physical toy construction elements of the toy construction system. In particular, in some embodiments, the process creates a data structure comprising information about a number of construction elements and their relative position and orientation relative to another and/or relative to a suitable coordinate system. The data structure may further comprise information, for each construction element of the virtual model, about the type of construction element, its colour and/or further features, such as a weight, surface texture and/or the like. In some embodiments, the data structure representing a virtual construction element further comprises information about the type and positions of the coupling members of the construction element. Accordingly, the data structure of the virtual model may comprise connectivity information indicative of which virtual construction elements are interconnected with each other via which of their respective coupling members. An example of such a data structure is described in U.S. Pat. No. 7,439,972.

For example, the process may detect the virtual construction elements included in the toy construction model from which the virtual object is created, e.g. from a captured image of a physical model, for example using the technique described in WO 2011/017393, or from a suitable digital representation, e.g. from a data structure describing a virtual toy construction model constructed by the user using a virtual toy construction tool, such as the LEGO digital designer by LEGO NS, Denmark. The process may then generate a 3D virtual model by automatically adding toy construction elements of the suitable size, colour and size matching the toy construction elements of the input model so as to construct at least some of the remaining sides of the model not included in the two-dimensional view. For example, the process may initially create a 3D model from the two-dimensional view and then use the technique described U.S. Pat. No. 7,092,988 for creating a brick model of individual virtual construction element from the 3D model.

Alternatively or additionally, the process may create the three-dimensional graphical representation with visible recurring features common to all or some toy construction elements of the system, such as coupling members. In one embodiment, the process detects positions of coupling members of the toy construction elements along the edges of the extracted two-dimensional view and adds graphical representations of corresponding coupling members at corresponding positions of the three-dimensional graphical representation, e.g. on corresponding positions on the circumferential surface of the three-dimensional graphical representation.

In some embodiments, the processor is further configured to detect, in addition to the visual attribute parameter, a presence of one or more visual features of the toy construction model. For example, the process may detect a presence of a predetermined feature from a set of predetermined features, e.g. one of a set of eyes, one of a set of mouths of a creature, the presence and/or type and/or size of a door or a window of a house and/or the like. To this end, the toy construction set may comprise toy construction elements having such specific features such as specific types of toy construction elements resembling doors or windows, toy construction elements having slanted side faces, etc.; alternatively, the toy construction set may include a set of tags, stickers or similar elements that are attachable to a toy construction model, e.g. adhesively attachable.

In some embodiments, the toy construction elements have a top surface, a bottom surface, and coupling members placed on at least one of the top and the bottom surface. The toy construction elements may have a uniform height defined between the top and bottom surfaces. In some embodiments, the coupling members are adapted to define a direction of connection and to allow interconnection of each construction element with another construction element in a discrete number of predetermined relative orientations relative to the construction element. Consequently, a large variety of possible building options are available while ensuring interconnectivity of the building elements. Moreover, the rule-based construction facilitates detection of the toy construction model in a captured image. The coupling members may be positioned on grid points of a regular grid, and the dimensions of the toy construction elements may be defined as integer multiples of a unit length defined by the regular grid. It will be understood that a three-dimensional grid may be defined by a single unit length, by two unit lengths, e.g. one unit length applicable in two spatial dimensions while the other unit length is applicable in the third spatial dimension. Yet alternatively, the three-dimensional grid may define three unit lengths, one for each spatial dimension. In some embodiments, the process determines the size of the extracted two-dimensional view as an integer multiple of a unit length defined by the regular grid of coupling members. The size of a created graphical representation of the created virtual object may then be determined by the process as a corresponding multiple of a unit length applicable for the spatial dimension of the first direction.

Alternatively or additionally, some embodiments of the method comprise detecting, from an extracted view of the toy construction model—e.g. from an extracted 2D view—, the positions of grid points defined by the coupling members of the toy construction system. The grid points may then be used to define a local coordinate system relative to the created graphical representation of the virtual object. The grid points may be used to identify grid positions on one or more surfaces of the created representation, e.g. upwardly facing surfaces, and to add graphical representations of coupling members at the determined grid positions on one or more visible surfaces of a three-dimensional graphical representation. The detected grid positions may be used when positioning the created virtual object within the virtual environment. To this end, the virtual environment may have an associated global coordinate system defining discrete positions. The distances between the discrete positions may be defined by the one or more unit lengths of the toy construction system. The detected positions of coupling members of the extracted two-dimensional view may be used to position the created virtual object in the virtual environment at a position and orientation consistent with the global coordinate system.

The coupling members may utilise any suitable mechanism for releasably connecting construction elements with other construction elements. In some embodiments, the coupling members comprise one or more protrusions and one or more cavities, each cavity being adapted to receive at least one of the protrusions in a frictional engagement.

Embodiments of the toy construction system allow a user to construct a large variety of toy construction models in a uniform and well-structured manner and with a limited set of different toy construction elements. For example, a toy construction system may be provided as a toy construction set comprising a number of toy construction elements. The user may also create a large variety of virtual objects which exhibit a large variety of behavioural attributes in a virtual environment.

In some embodiments, the toy construction system comprises a data processing system as described below. The data processing system may include the processor; the data processing system may further comprise an image capturing device and a display or other output device.

The present disclosure relates to different aspects including the toy construction systems described above and in the following, corresponding apparatus, systems, methods, and/or products, each yielding one or more of the benefits and advantages described in connection with one or both of the first mentioned aspects, and each having one or more embodiments corresponding to the embodiments described in connection with one or both of the first mentioned aspects and/or disclosed in the appended claims.

In particular, the present disclosure further relates to a computer-implemented method of creating a virtual object in a computer-generated virtual environment, the method comprising:
   receiving a digital representation of a toy construction model constructed from one or more toy construction elements, each comprising coupling members configured for releasably interconnecting the toy construction elements with each other;
   extracting a two-dimensional view of the toy construction model from the received digital representation;
   creating a virtual object in a virtual environment; and
   creating a three-dimensional graphical representation of the virtual object from the extracted two-dimensional view, wherein the created three-dimensional representation has a first view, seen along a first direction, defined by the extracted two-dimensional view, and a size along the first direction determined from a size of the extracted two-dimensional view.

Furthermore, the present disclosure further relates to a computer-implemented method of controlling a virtual object in a computer-generated virtual environment, the method comprising:
   receiving a digital representation of a toy construction model constructed from one or more toy construction elements, each comprising coupling members configured for releasably interconnecting the toy construction elements with each other;
   determining, from the received digital representation, one or more visual attribute parameters, each indicative of a respective visual attribute derivable from one or more of a colour, a shape and a size of the toy construction model;
   creating a virtual object in the virtual environment; and
   controlling the virtual object in the virtual environment to have a behaviour based on the determined one or more visual attribute parameters.

Generally, the digital representation may comprise one or more digital images of the toy construction model or another digital representation from which the two-dimensional view may be extracted and/or from which visual attribute parameters may be determined, e.g. a data structure identifying the respective shape, size and colour of the individual toy construction elements and their relative position within the model. Such a representation may e.g. be obtained by processing one or more captured images of a physical toy construction model or by creating the digital representation by a suitable computer program, e.g. a program allowing a user to construct virtual construction models from virtual counterparts of physical toy construction elements.

Examples of computer programs allowing a user to construct virtual construction models from virtual counterparts of physical toy construction elements are e.g. described in WO 2004/104811 and U.S. Pat. No. 7,596,473.

According to one aspect, it is desirable to provide a user-interface for creating a virtual construction model that is easy to use and that simulates the physical construction process.

According to further aspects, disclosed herein are embodiments of a computer-implemented method of manipulating a three-dimensional virtual construction model assembled from a plurality of virtual construction elements, the method comprising:

displaying a representation of a virtual construction model;

displaying a plurality of virtual construction elements and allowing a user to select one or more virtual construction elements and to add the selected virtual construction element to the virtual construction model, According to one particular aspect, displaying the plurality of virtual construction elements comprises displaying the virtual construction elements as a simulated heap of arbitrarily positioned virtual construction elements; wherein allowing a user to select one or more virtual construction elements comprises allowing a user to select a virtual construction element from the simulated heap and to reposition the selected construction element within the selection area.

In some embodiments, virtual construction elements in the simulated heap may at least partly obstruct each other from view, e.g. as some virtual construction elements are positioned on top of other virtual construction elements in the heap. Repositioning of a first virtual construction element may thus cause a second virtual construction element that was previously obstructed from view by the first construction element to become visible.

The virtual construction elements of a virtual construction model may be interconnected to each other in a regular structure and adding a virtual construction element to the virtual model, may comprise interconnecting the added virtual construction element with one or more other virtual construction elements of the virtual construction model according to one or more connectivity rules. Examples of such interconnectivity rules are disclosed in U.S. Pat. No. 7,439,972. In particular, the virtual construction elements may only be positioned in a discrete number of relative positions and/or orientations with respect to each other and/or be interconnected with each other at predetermined connection points.

In contrast, the virtual construction elements in the selection area may be positioned in an unstructured fashion, e.g. at arbitrary relative positions and/or distances relative to another. Accordingly, repositioning a virtual construction element may not be restricted by the construction rules of the virtual construction elements in the model. Hence, repositioning virtual construction elements in the selection area may simulate the process of searching for a specific construction element in a heap of physical construction elements.

According to another aspect, the process comprises computing a virtual attribute of a virtual object represented by the virtual construction model; and, responsive to adding a virtual construction element to the virtual construction model, dynamically re-computing the virtual attribute. The recomputed virtual attribute may thus be displayed so as to allow the user to monitor the effects of the construction actions on the virtual attributes of the resulting virtual object/character. It will be appreciated, that the process may also allow the user to remove virtual construction elements from the model and/or to reposition virtual construction elements within the model. These actions may also result in a re-computation of the virtual attribute.

The present disclosure further relates to a computer program product comprising program code means adapted to cause, when executed on a data processing system, said data processing system to perform the steps of one or more of the methods described herein.

The computer program product may be provided as a computer-readable medium, such as a CD-ROM, DVD, optical disc, memory card, flash memory, magnetic storage device, floppy disk, hard disk, etc. In other embodiments, a computer program product may be provided as a downloadable software package, e.g. on a web server for download over the internet or other computer or communication network, or an application for download to a mobile device from an App store.

The present disclosure further relates to a data processing system configured to perform the steps of an embodiment of one or more of the methods disclosed herein. To this end, the data processing system may comprise or be connectable to a computer-readable medium from which a computer program can be loaded into a processor, such as a CPU, for execution. The computer-readable medium may thus have stored thereon program code means adapted to cause, when executed on the data processing system, the data processing system to perform the steps of the method described herein. The data processing system may comprise a suitably programmed computer such as a portable computer, a tablet computer, a smartphone, a PDA or another programmable computing device having a graphical user-interface.

In some embodiments, the data processing system may include a client system, e.g. including a camera and a user interface, and a host system which may create and control the virtual environment. The client and the host system may be connected via a suitable communications network such as the internet.

Here and in the following, the term processor is intended to comprise any circuit and/or device suitably adapted to perform the functions described herein. In particular, the above term comprises general- or special-purpose programmable microprocessors, such as a Central processing unit (CPU) of a computer or other data processing system, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof.

Some embodiments of the data processing system include an image capturing device, such as a camera, e.g. a video camera, or any other suitable device for obtaining an image of a toy construction model. Other embodiments may be configured to generate a digital representation of the toy construction model and/or retrieve a previously generated digital representation. Embodiments of the data processing system may include a display or other output device for presenting the virtual environment to a user.

The present disclosure further relates to a toy construction set comprising a plurality of toy construction elements and instructions to obtain a computer program computer program code that causes a data processing system to carry out the steps of an embodiment of one or more of the methods described herein, when the computer program code is executed by the data processing system. For example, the instructions may be provide in the form of an internet address, a reference to an App store, or the like. The toy construction set may even comprise a computer-readable medium having stored thereon such as computer program code. Such a toy construction set may even comprise a camera or other image capturing device connectable to a data processing system.

BRIEF DESCRIPTION OF THE DRAWINGS

FIGS. 1-3 each show a prior art toy construction element.

FIG. 4 illustrates an example of a toy construction system.

DETAILED DESCRIPTION

Figure 5:
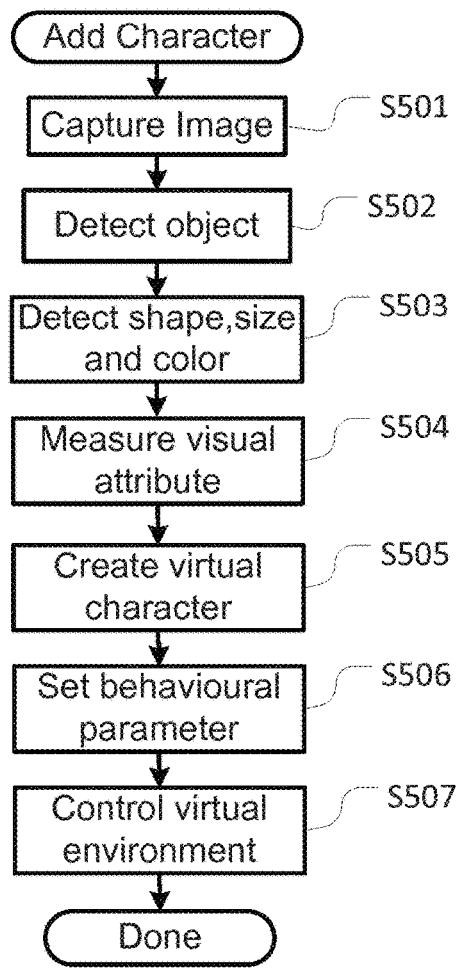
FIG. 5 illustrates an example of a process for controlling a virtual character in a virtual environment.

Various aspects and embodiments of toy construction systems disclosed herein will now be described with reference to toy construction elements in the form of bricks. However, the invention may be applied to other forms of construction elements for use in toy construction sets.

In FIG. 1 is shown a toy construction element with coupling studs on its top surface and a cavity extending into the brick from the bottom. The cavity has a central tube, and coupling studs on another brick can be received in the cavity in a frictional engagement as disclosed in U.S. Pat. No. 3,005,282. FIGS. 2 and 3 show other such prior art construction elements. The construction elements shown in the remaining figures have this known type of coupling members in the form of cooperating studs and cavities. However, other types of coupling members may also be used in addition to or instead of the studs and cavities. The coupling studs are arranged in a square planar grid, i.e. defining orthogonal directions along which sequences of coupling studs are arranged. The distance between neighbouring coupling studs is uniform and equal in both directions. This or similar arrangements of coupling members at coupling locations defining a regular planar grid allow the toy construction elements to be interconnected in a discrete number of positions and orientations relative two each other, in particular at right angles with respect to each other.

FIG. 4 shows an embodiment of a toy construction system. The system comprises a computer 401, an input device 402, a display 403, a camera 404 and a toy construction model 406 constructed from at least one toy construction element.

The computer 401 may be a personal computer, a desktop computer, a laptop computer, a handheld computer such as a tablet computer, a smartphone or the like, a game console, a handheld entertainment device, or any other suitably programmable computer. The computer 401 comprises a processor 409 such as a Central Processing Unit (CPU) and one or more storage devices such as a memory, a hard disk, and/or the like.

The display 403 is operatively coupled to the computer 401 and the computer 401 is configured to present a graphical representation of a virtual environment 411 on the display 403. Though illustrated as separate functional blocks in FIG. 4, it will be appreciated that the display may be integrated in the housing of the computer.

The input device 402 is operatively coupled to the computer 401 and is configured to receive user inputs. For example, the input device may comprise a keyboard, a mouse, or other pointing device, and/or the like. In some embodiments, the system comprises more than one input device. In some embodiments an input device may be integrated in the computer and/or the display, e.g. in the form of a touch screen. It will be appreciated that the system may comprise further peripheral computer devices operatively coupled to, such as integrated into, the computer.

The camera 404 is operable to capture one or more images of the toy construction model 406 and to forward the captured image to the computer 401. To this end, a user may position the toy construction model 406 on a suitable background surface 4, e.g. a desktop, a floor, or the like, and direct the camera to capture an image of at least a portion of the surface including the toy construction model. In some embodiments, the user may construct the toy construction model on top of a base plate, e.g. as described below. The camera may be a digital camera operable to take a digital picture, e.g. in the form of a two-dimensional array of pixels. Alternatively other types of image capturing devices may be used.

The display 403, the camera 404 and the input device 402 may be operationally coupled to the computer in a variety of ways. For example one or more of the above devices may be coupled to the computer via a suitable wired or wireless input interface of the computer 401, e.g. via a serial or parallel port of the computer such as a USB port, via Bluetooth, Wifi or another suitable wireless communications interface. Alternative, one or all of the devices may be integrated into the computer. For example, the computer may comprise an integrated display and/or input device and/or an integrated camera. In particular, many tablet computers and smartphones comprise an integrated camera, an integrated touch screen operable as a display and input device.

The computer 401 has stored thereon a program, e.g. an App or other software application, adapted to simulate a virtual environment, to process captured images and to create virtual objects as described herein.

It will be appreciated that, in some embodiments, the computer 401 may be communicatively connected to a host system, e.g. via the Internet or another suitable computer network. At least a part of the processing described herein may then be performed by the host system. For example, in some embodiments, a host system may generate and simulate a virtual environment, such as a virtual world which may be accessible by multiple users from respective client computers. A user may use a client computer executing a suitable program to capture an image. The captured image may be processed by the client computer or uploaded to the host system for processing and creation of a corresponding virtual object. The host system may then add the virtual object to the virtual world and control the virtual object within the virtual world as described herein.

In the example, of FIG. 4, the virtual environment 411 is an underwater environment such as a virtual aquarium or other underwater environment. The virtual objects 407, 408 resemble fish or other underwater animals or creatures. In particular, the computer has created one virtual object 407 based on the captured image of the toy construction model 406. The computer has created the virtual object 407 so as to resemble the toy construction model. In the example of FIG. 4, the virtual object 407 resembles the shape and colour of the toy construction model 406. In the present example, the virtual object even resembles the individual toy construction elements from which the toy construction model 406 has been constructed. It will be appreciated, however, that different levels of resemblance may be implemented. For example, in some embodiments, the virtual object may be created so as to resemble only the overall shape of the construction model without simulating its internal structure of individual toy construction elements. The virtual object may also be created to have a size corresponding to the size of the virtual construction element, e.g. by providing a reference length scale on the background surface 405 so as to allow the computer to determine the actual size of the toy construction model. Alternatively, the computer may use the size of the toy construction elements as a reference length scale. In yet alternative embodiments, the user may manually scale the size of the virtual object. The process may also create a 3D graphical representation of the virtual object, e.g. as described with reference to FIGS. 7-13 below.

FIG. 5 illustrates an example of a process for controlling a virtual character or other virtual object in a virtual environment. For example the process may be performed by the system of FIG. 4.

In initial step S501, the process obtains a digital representation of the toy construction model. For example, the process may capture a digital image of a toy construction model e.g. directly from a camera or via a data carrier, storage device or a computer network.

In subsequent steps S502 and S503, the process detects the toy construction model within the digital image and detects the shape, size and colour of the detected toy construction model. To this end, the process may perform one or more image processing steps known per se in the art of digital image processing and object recognition. For example the processing may comprise one or more of the following steps: background detection, edge detection, colour calibration, colour detection. For example, an example of a process for detecting a toy construction model in a digital image is described in WO 2011/017393. If the process is based on a different kind of representation, other than a digital image, the process may detect the shape, size and colour of the toy construction model from the digital representation. The detection step may result in an extracted two-dimensional view of the toy construction model where any background has been removed. The two-dimensional view may include information about the position, type colour and/or the like of detected toy construction elements. In some embodiments, the extracted view may include information about detected features such as eyes of a fish, wheels of a car, a door of a house, and/or the like. In some embodiments, the extracted view may include information about detected coupling members, e.g. their type and/or position.

In subsequent step S504, the process determines one or more visual attributes of the detected toy construction model, e.g. an aspect ratio of the detected shape, a dominant colour, and/or the like.

In step S505, the process creates a virtual object based on the detected shape, size and colour of the toy construction model. To this end, the process may create a surface having the detected shape, size and colour. If movement of the virtual object is to be animated in the virtual environment, the process may further create a skeleton matching the detected shape and size.

In step S506, the process sets the values of one or more virtual attributes associated with the virtual object. The process sets the values based on the detected visual attributes. For example:
  the process may set a maximum speed parameter based on the aspect ratio: max_speed=F(aspect ratio);
  the process may set a food type of the virtual object based on the detected colour, e.g.
    Case (colour)
      (red): food type=meat;
      (green): Food type=plants;
      (else): Food type=all.
  The process may set the required daily calorie intake of a virtual character based on the detected size of the toy construction model.

In step S507, the process adds the virtual object to the virtual environment and controls evolution of the virtual environment including the behaviour of the virtual object. To this end, the process may execute a control process which implements a control system for controlling a virtual object in a virtual environment.

Figure 6:
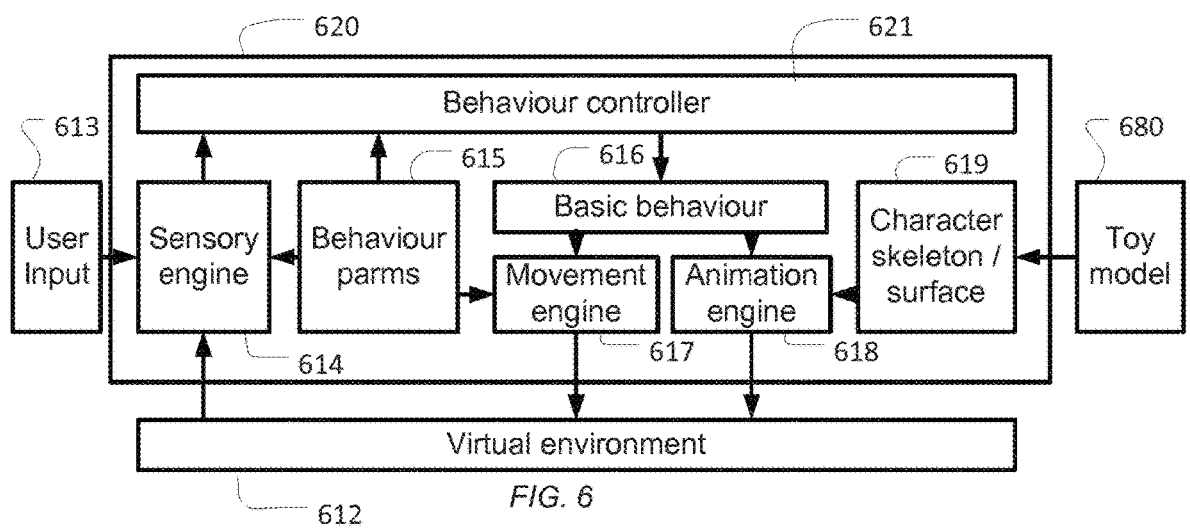
FIG. 6 illustrates a functional block diagram of a control system for controlling a virtual character in a virtual environment.

FIG. 6 illustrates a functional block diagram of a control system for controlling a virtual character in a virtual environment. It will be appreciated that the control system may also be used to control other virtual objects.

The control system, generally designated 620, may be implemented by a computer program executed on a data processing system. The control system comprises a number of functional blocks and interfaces with the virtual environment 612 within which the virtual character exists.

The control system comprises a sensory engine module 614 receiving input from the virtual environment 612, e.g. data indicative of the position and status of other virtual characters in the environment. The sensory engine may also receive user input 613. The sensory engine 614 processes the received data so as to filter relevant data and/or events that influence the behaviour of the virtual character and forwards the filtered and processed data/events to a behaviour control module 621. The behaviour control module defines the goals of the virtual character (such as look for food, defend a certain territory, and/or the like). The behaviour control layer results in a selection of a sequence of basic behaviour, e.g. selected from a repertory of pre-programmed behaviours (such as "move from A to B", etc.). The basic behaviours may then be controlled by one or more basic behaviour controllers 616 which represent a lower level of the control system. The basic behaviour controller 616 may in turn control a yet lower control level including a movement engine 617 which controls the movement of the visual character in the virtual environment and an animation engine 618 which implements the animation of the virtual character. The lower level control modules 617 and 618 may then interface with and update the virtual environment 612.

As described herein, the appearance and attributes of the virtual characters are determined based on the visual appearance of a captured image of a toy construction model. They may be expressed by a number of behaviour parameters 615 and a data structure 619 representing the surface and skeleton of the virtual character. The data structure is generated from a digital representation 680, e.g. a captured image, of a toy construction model, e.g. as described in connection with the process of FIG. 5. The virtual attributes 615 and the data structure 619 may then be used by the control system controlling the virtual character. As is illustrated in the example of FIG. 6, these parameters may influence the control system at different levels. In particular, the sensory engine may process and filter input from the virtual environment and/or user input dependent on one or more of the behaviour parameters, i.e. the behaviour parameters may control which events/input the virtual character is perceptive to and how. Similarly the behaviour parameters may control the processing of the top-level behaviour control module 621, i.e. how the virtual character reacts on the received inputs. Alternatively or additionally, the behaviour parameters may influence the lower level control of the virtual character, e.g. the movement engine 617. For example, the behaviour parameters may determine a maximal speed with which a virtual character can move. Similarly, the data structure 619 defining the visual appearance of the virtual character is used by the animation engine 618 when animating the virtual character.

Figure 7:
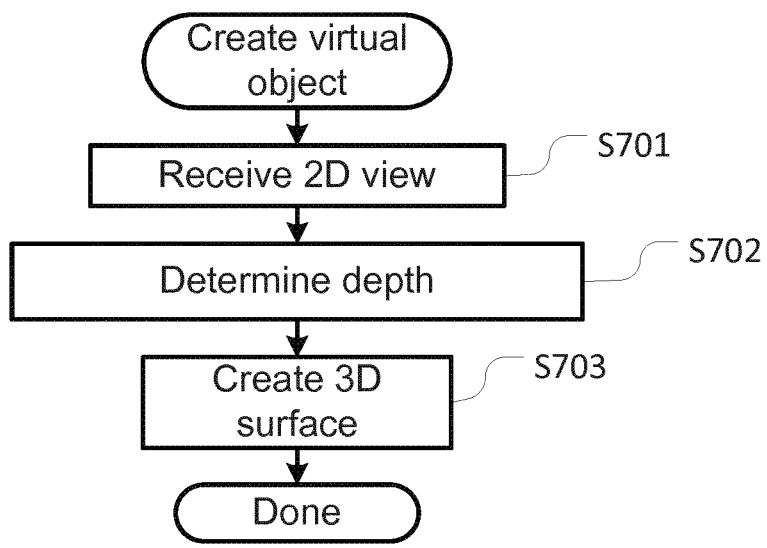
FIG. 7 illustrates an example of a process of creating a virtual character or virtual object based on the detected shape and size of a toy construction model.

FIG. 7 illustrates an example of a process of creating a virtual object based on the detected shape and size of a toy construction model. The process of FIG. 7 illustrates an example of step S505 of FIG. 5.

In initial step S701, the process receives an extracted two-dimensional view of a detected toy construction model in a captured image, e.g. as provided by steps S501-S502 and, optionally S503 of FIG. 5.

In step S702, the process determines a linear extent, e.g. a width, of the extracted 2D view and computes the depth (the dimension in the direction normal to the side face of the object that is created so as to match the extracted 2D view). For example, the process identifies a bottom edge and two lateral edges of the 2D view and determines the distance between the lateral edges measured along the bottom edge. In step S702, the process may further determine the colour or colours of the 2D view along the edges of the 2D view and, optionally, further features, such as the location of coupling members along the edges. The depth may then be computed as being equal to the determined width. Alternatively the depth may be computed as a different function of the determined width, e.g. as the width multiplied by a predetermined factor, by a factor that depends on a determined height of the extracted 2D view, etc.

In step S703, the process creates a 3D surface of a virtual object such that the object has a side face defined by the extracted 2D view and such that cross sections of the object in planes parallel to said side face have a periphery as defined by the extracted 2D view. The side face of the 3D surface matching the extracted 3D view may be generated so as to have the same colour(s) and/or texture, and/or other visible features as the extracted 2D view. The circumferential surfaces of the created 3D surface, i.e. the surfaces defined by the peripheries of said cross sections may have a colour or colours and/or texture and/or other visible features as the side face in a predetermined proximity to the corresponding portion of the edge of the extracted 2D view. A side face opposite the side face that matches the extracted 2D view may be created so as to also match the extracted 2D view or, alternatively, at least partially matching the extracted 2D view. For example, the side of a house opposite the side created based on the extracted 2D view may be created with the same shape and/or colour(s), but without a door and/or without any window. Alternatively all windows, doors and/or other visible features of the front face (that was based on the extracted 2D view) may also be added to the opposite side face.

A virtual object may be created as a solid object or as a hollow object, e.g. such that an interior of the created 3D object is visible through transparent portions of its surface, e.g. through a window of a house, through an open door of a house, etc. To this end the surfaces/walls of the object may be created in a predetermined thickness, e.g. as defined by a unit length of the toy construction system such as by the distance between neighbouring coupling members. In particular, the walls may be created as if built from virtual construction elements of a predetermined size.

Figure 8:
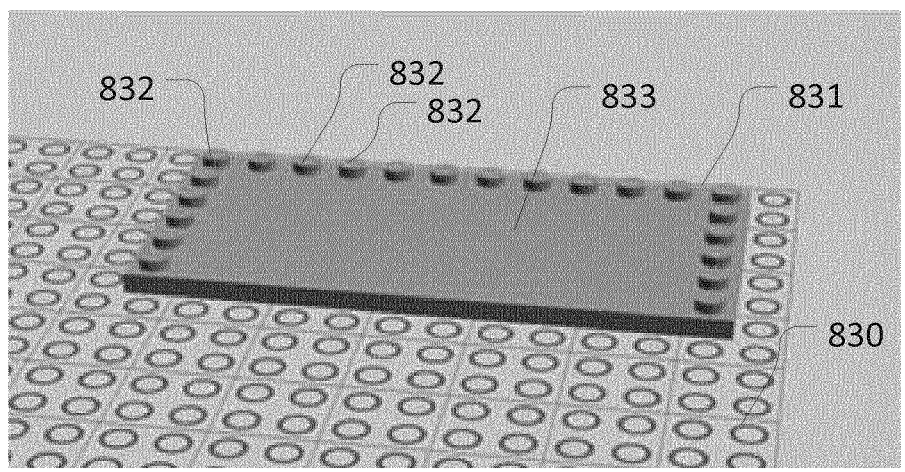
FIG. 8 shows an example of a base plate of a toy construction system.

FIG. 8 shows an example of a base plate of a toy construction system. The base plate 831 comprises coupling members 832, in this example coupling studs that frictionally engage corresponding cavities in another toy construction element. The coupling members 832 are arranged on grid points of a two-dimensional square grid, as illustrated by circles of a virtual base surface 830. The coupling members are arranged around a surface area 833 that may comprise a visible tag (not shown in FIG. 8) for use by the detection system for proper alignment, scaling and/or colour calibration of the captured image.

Figure 9:
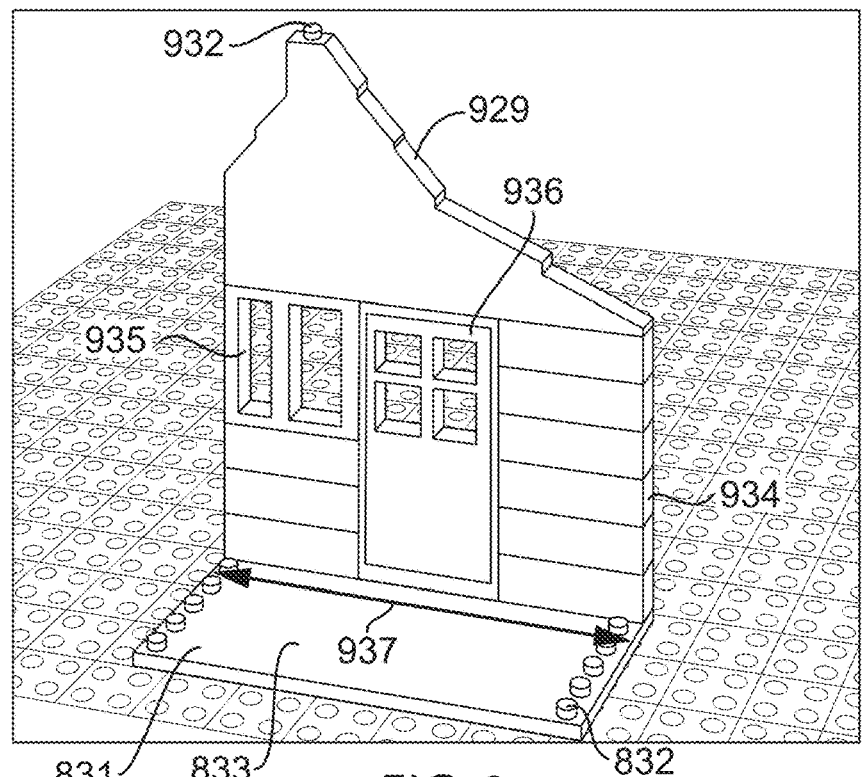
FIG. 9 shows an example of a toy construction model constructed on the base plate of FIG. 8.

FIG. 9 shows an example of a toy construction model constructed on the base plate 831 of FIG. 8. The toy construction model 934 is constructed from toy construction elements of the type described above, e.g. with reference to FIGS. 1-3. The toy construction model 934 is a model of a front wall of a house including a door 936, a window 935 and a roof 929. The toy construction elements of the model comprise coupling members as the one described above; one of the coupling members 932 is visible at the uppermost surface of the model. The door 936 and the window 935 are constructed from special construction elements resembling a door and a window, respectively. Alternatively, doors and/or windows may be constructed from simple, brick-like elements, e.g. by merely leaving openings in the wall. In the example, of FIG. 9, the model has a width, as indicated by double arrow 937, corresponding to 12 units length as defined by the distance between neighbouring coupling member locations of the grid of coupling members. As can be seen by the example of FIG. 9, the model merely resembles a front wall of a house rather than being a model of an entire wall. Hence, though constructed from construction elements having a finite width, the model is effectively a 2D representation of a wall of a house.

Figure 10:
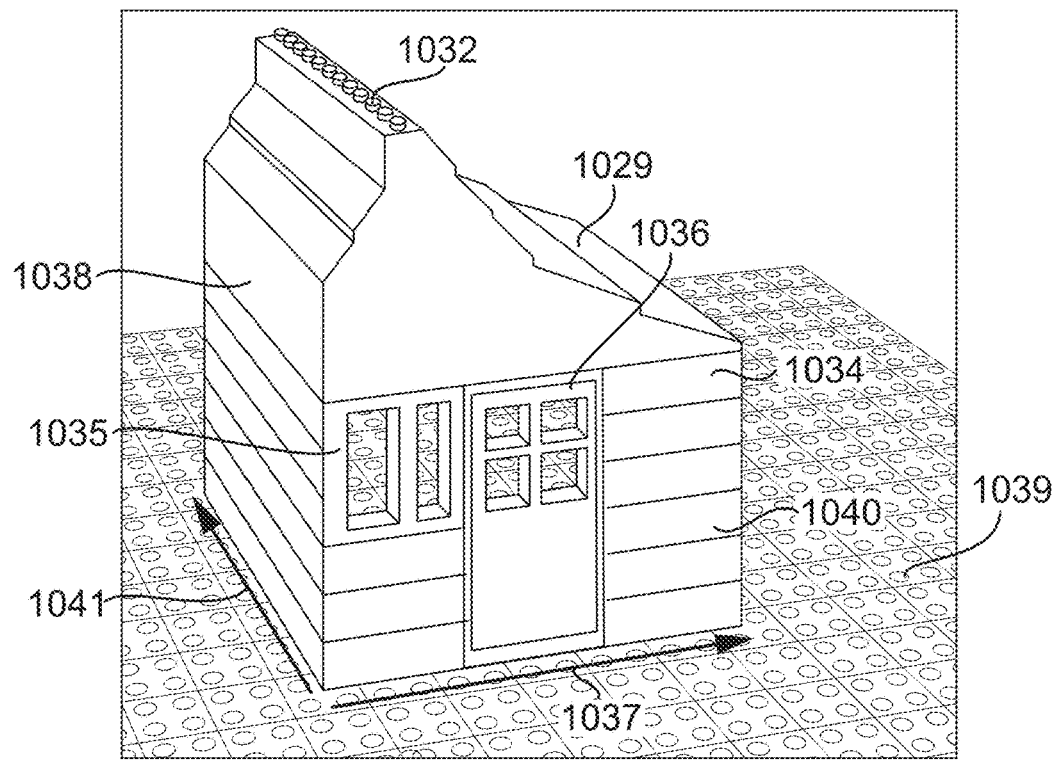
FIG. 10 shows an example of a 3D graphical representation of a virtual object in a virtual environment where the virtual object is created from a captured image of the toy construction model of FIG. 9.

FIG. 10 shows an example of a 3D graphical representation of a virtual object in a virtual environment where the virtual object is created from a captured image of the toy construction model 934 of FIG. 9. The virtual object 1034 represents a house having a front face 1040 resembling the front view of the toy construction model 934 of FIG. 9, including graphical representations of a door 1036, a window 1035 and a roof 1029 in accordance with the corresponding features of the toy construction model 934 of FIG. 8, and having colours as the corresponding model 934. The virtual object 1034 is positioned on a base surface 1039 which, in the example of FIG. 10 illustrates a grid of coupling locations representing a global coordinate system. The virtual object 1034 is aligned with this grid of coupling locations and is created to have a width in the direction (indicated by arrow 1037) parallel to the front face 1040 of 12 units length as the toy construction model 934 of FIG. 9 from which the virtual object 1034 is generated. The graphical representation 1034 represents a 3D virtual object having a depth in the direction (indicated by arrow 1041) normal to the front face 1040 equal to the width of the model, i.e. in this example 12 length units.

The side faces 1038 are created as a simulated extrusion of the edges of the periphery of the front face 1040 in the direction (indicated by arrow 1041) normal to the front face.

The side faces 1038 are created in the same colours as the corresponding edges of the front face 1040. Moreover, the top surface of the 3D graphical representation of the building is created with a sequence of coupling members 1032 corresponding to the coupling member 932 of the model of FIG. 9. The coupling members are created in alignment with a local coordinate system and with the distance between neighbouring coupling members as defined by the coupling members of the base plate of FIG. 9. The door 1039 and the window 1035 are represented so as to allow a view in the interior of the house.

In this and other embodiments, the virtual object is associated with a virtual construction model constructed from a plurality of interconnected virtual construction elements. The virtual construction elements may represent physical toy construction elements of the toy construction system; in particular, the virtual construction elements may have a visual appearance resembling the corresponding physical construction elements. The virtual construction elements may further comprise virtual coupling members or coupling points representing positions at which a virtual construction element can be connected. A virtual construction model may thus be represented by a data structure indicative of which virtual construction elements are included in the model and how they are positioned and, optionally, how they are interconnected relative to each other and/or relative to a common coordinate system. Accordingly, the process of creating a graphical representation of the virtual object (e.g. step S703 above) may generally comprise creating a three-dimensional virtual toy construction model having a side face matching the detected two-dimensional view. If the detected two-dimensional view includes information about detected toy construction elements, the process may create a first surface portion of the created virtual model based on this information, i.e. such that the first part of the surface comprises the detected construction elements. The simulated extruded side faces may be created such that the process adds, for each construction element detected along a circumference of the two-dimensional view, a linear sequence of further construction elements matching the detected construction elements, where the sequence of added construction elements extends in a direction normal to the two-dimensional view from the corresponding detected construction element at the edge of the side view. As the detection of the 2D view may not necessarily include depth information (in the direction normal to the 2D view), the process may select toy construction elements matching the 2D side view and having a predetermined depth, e.g. one unit length of the toy construction model or a different suitable dimension.

Figure 11:
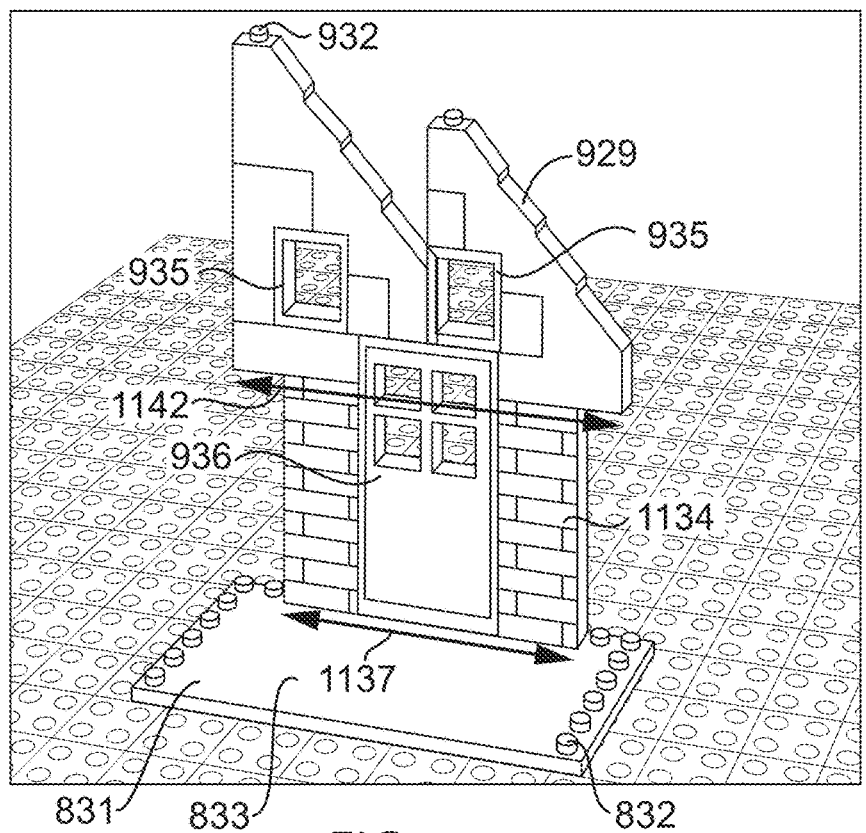
FIGS. 11 and 12 illustrate another example of the creation of a virtual object based on a physical construction model.
Figure 12:
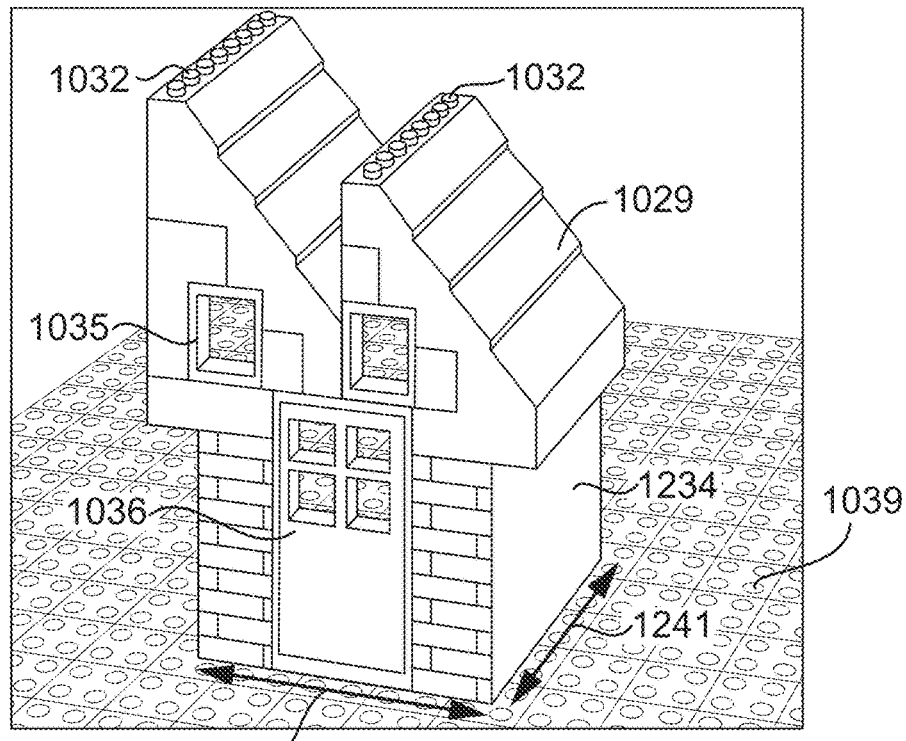

FIGS. 11 and 12 illustrate another example of the creation of a virtual object based on a physical construction model.

In particular, FIG. 11 shows an example of a toy construction model constructed on the base plate 831 of FIG. 8. The toy construction model 1134 is similar to the toy construction model of FIG. 9 in that it is constructed of toy construction elements of the type described above, in that it represents a front wall of a house including a door 936, windows 935 and a roof 929, all as described in connection with FIG. 9. The model 1134 of FIG. 11 differs from the model of FIG. 9 in that it does not have a constant width. The base of the model 1134 has a width of 8 length units, as indicated by double arrow 1137, while the roof is wider, in this example 10 units length, as indicated by double arrow 1142.

FIG. 12 shows an example of a 3D graphical representation of a virtual object in a virtual environment where the virtual object is created from a captured image of the toy construction model 1134 of FIG. 10. The virtual object 1234 is similar to the corresponding object 1034 of FIG. 10, but created based on the toy construction model 1134 of FIG. 11. In the example of FIG. 12, the 3D graphical representation is created with a constant depth (in the direction normal to the front face as indicated by arrow 1241) equal to the width of the base of the front face. It will be appreciated that, in alternative embodiments, the depth of the model may be determined in a different manner, e.g. as the maximum width of the front face, an average width or the like.

Figure 13:
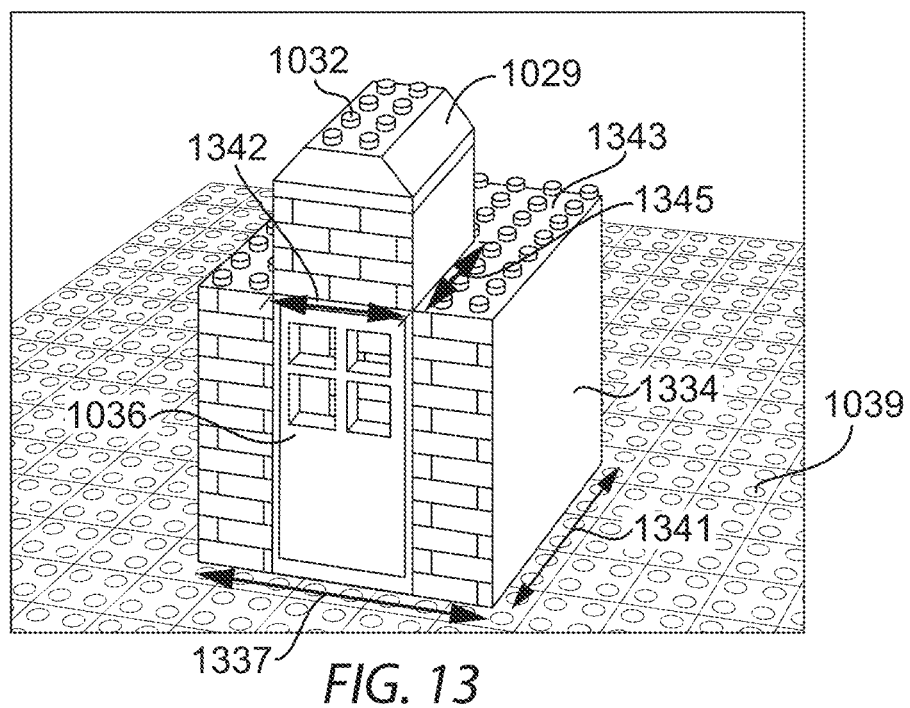
FIG. 13 shows another example of a 3D graphical representation of a virtual object in a virtual environment where the virtual object is created from a captured image of a toy construction model.

FIG. 13 shows another example of a 3D graphical representation of a virtual object in a virtual environment where the virtual object is created from a captured image of a toy construction model. The virtual object 1334 is similar to the corresponding object 1034 of FIG. 10 in that it represents a house, but created based on a different toy construction model. In the example of FIG. 13, the front face of the model and, hence, of its graphical representation 1334 is not constant. In this example, the bottom part of the house has a first width, as indicated by arrow 1337, while a top part has a smaller width as indicated by arrow 1342. The transition between the wide part and the narrow part is abrupt, i.e. the bottom part has a flat upper surface 1343 from which the bottom part extends. In this example, the graphical representation is created such that the bottom part of the model and the top part of the model each have their respective depth (indicated by arrows 1341 and 1345, respectively), equal to the respective width of the corresponding part.

In some embodiments, the process may determine whether or not to create the 3D representation with a constant depth based on one or more decision rules, e.g. based on the difference in width of the respective parts, whether the width changes abruptly or gradually, the respective sizes of the parts having different width, whether the different parts have the same or different colour, texture and/or other common or different features.

FIGS. 14A-H illustrate an example of the process of creating a virtual object based on a physical toy construction model. In the example of FIGS. 14A-H the process is performed by a tablet computer running an app. However, it will be appreciated that the process may be performed by a different type of data processing system.

Figure 14A:
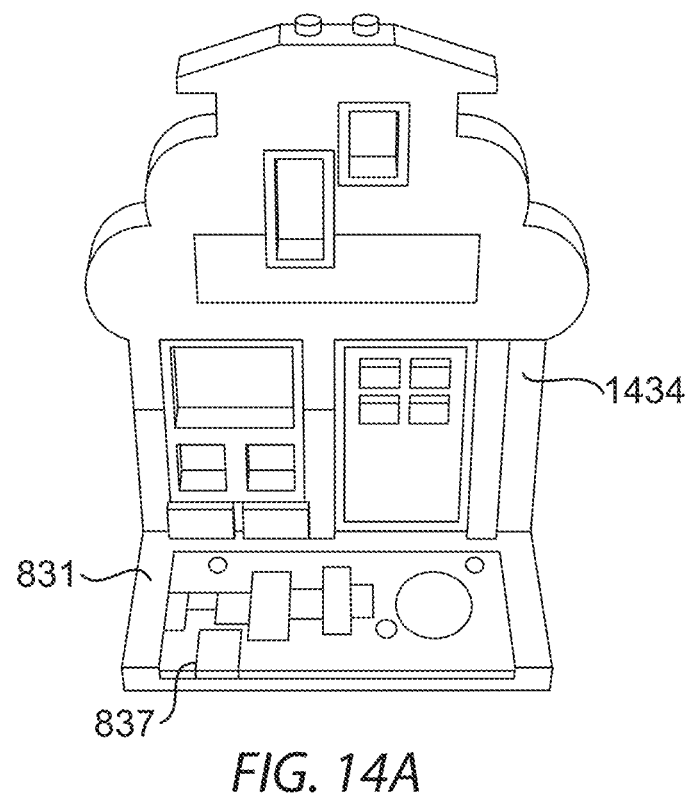
FIGS. 14A-H illustrate an example of the process of creating a virtual object based on a physical toy construction model.

In an initial step, as illustrated by FIG. 14A, the user constructs a physical model, e.g. as illustrated by the front side of a house 1434. As in the previous example, the house is constructed on a base plate 831 having a specific graphical pattern 837 for use during the image processing for alignment, scaling and/or colour calibration.

Figure 14B:
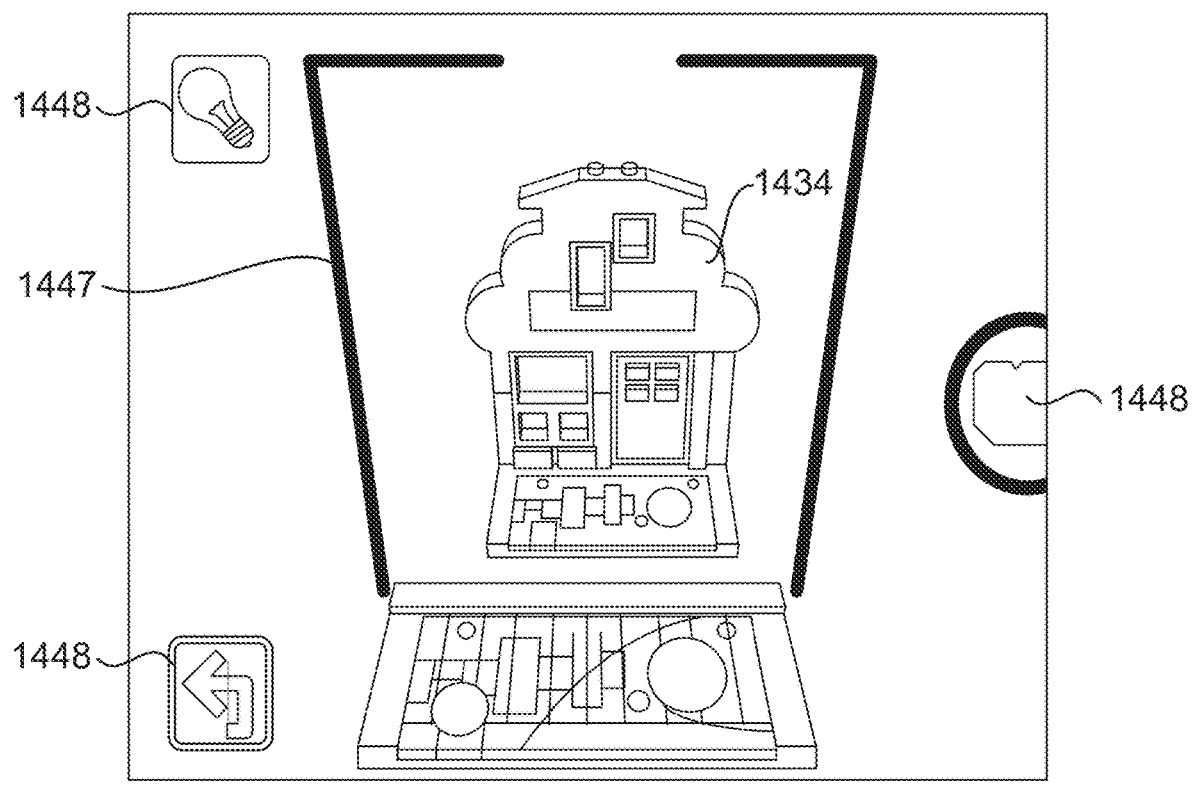

In a subsequent step, the user uses a camera of the tablet computer to capture an image of the constructed model. FIG. 14B shows a viewfinder view displayed on the display of the camera. The viewfinder view shows a frame 1447 assisting the user in correctly positioning the model within the field of view of the camera. The display further shows user interface elements 1448 allowing the user to control the camera functions.

Figure 14C:
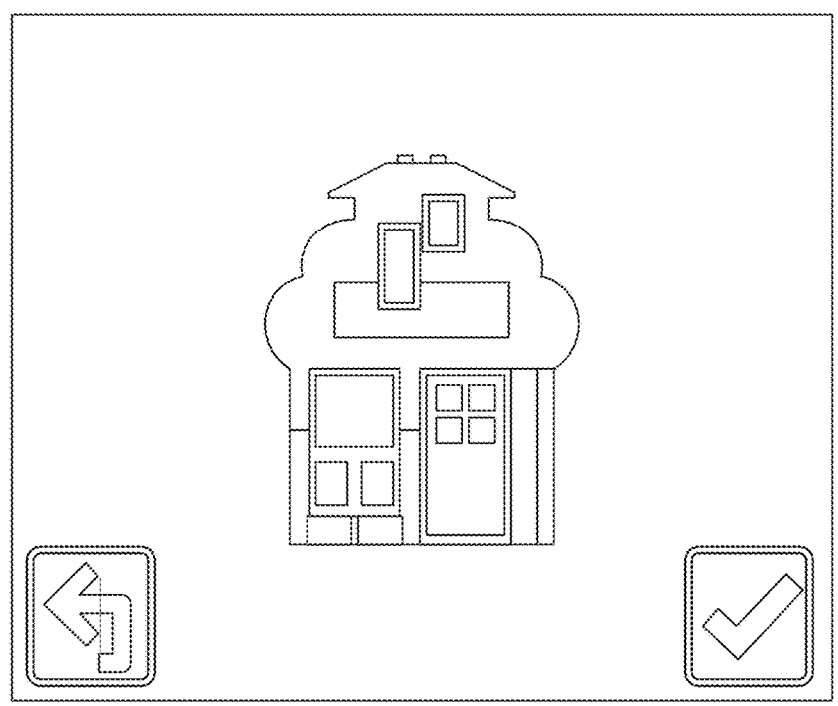

When the tablet computer has captured a picture, the computer processes the captured image to extract a 2D view of the model, e.g. using known image processing techniques, e.g. as described in WO 2011/017393. The computer may then display a picture of the extracted 2D view, e.g. as shown in FIG. 14C so as to allow the user to approve the extracted 2D view or to capture a new image.

Figure 14D:
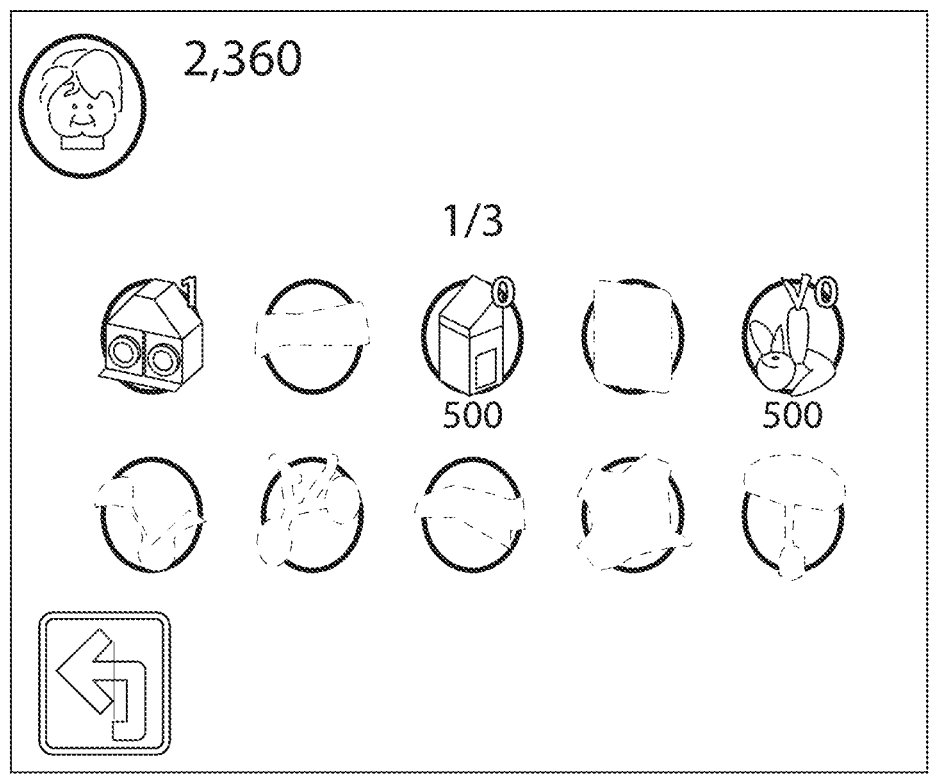

In some embodiments, the user may then be presented with a user interface, e.g. as illustrated in FIG. 14D, allowing the user to set one or more attributes of the virtual model, e.g. to select an inhabitant or to select other game-related attribute. In some embodiments, some or all the attributes may be selected automatically based on detected visual parameters of the extracted 2D view as described herein. In some embodiments, the process may allow the user to select some or all of the attributes but where the selectable choices are restricted or otherwise determined by the process based on the detected visual parameters. Examples of attributes may include the type of virtual character should be spawned responsive to introduction of the virtual object into the virtual environment.

Figure 14E:
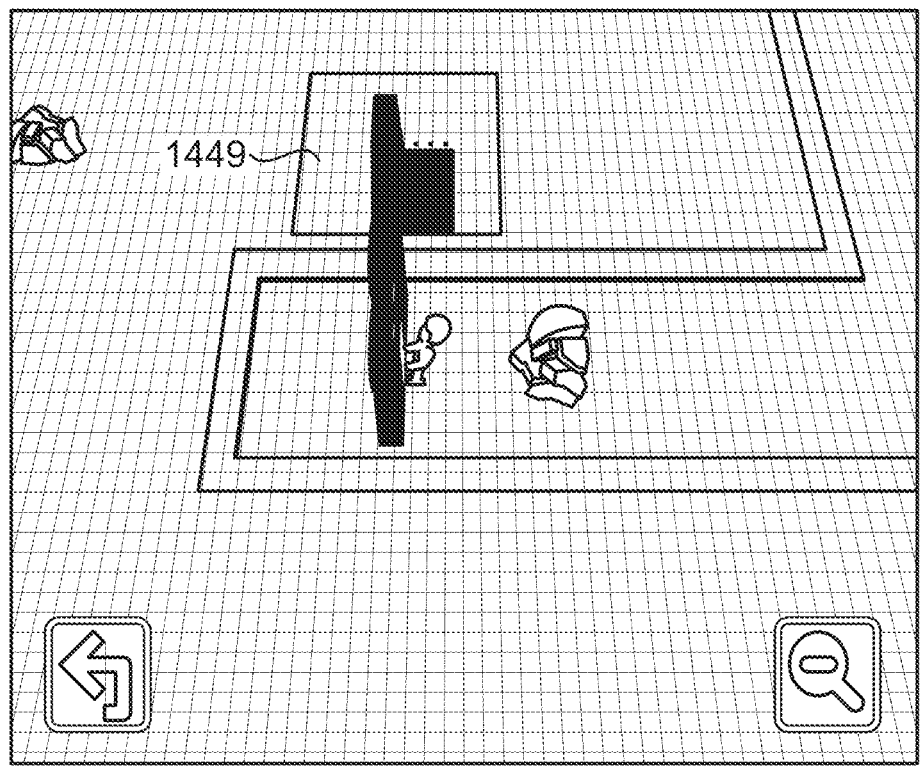

In a subsequent step, the virtual object is placed in a virtual environment, e.g. automatically by the process or in a user-controlled way. For example, the process may allow the user to place the newly created virtual object at a user-selected position, e.g. as illustrated by FIG. 14E showing a view of a part of a virtual environment, where the user has selected a position 1449 where the newly created house is to be positioned.

Figure 14F:
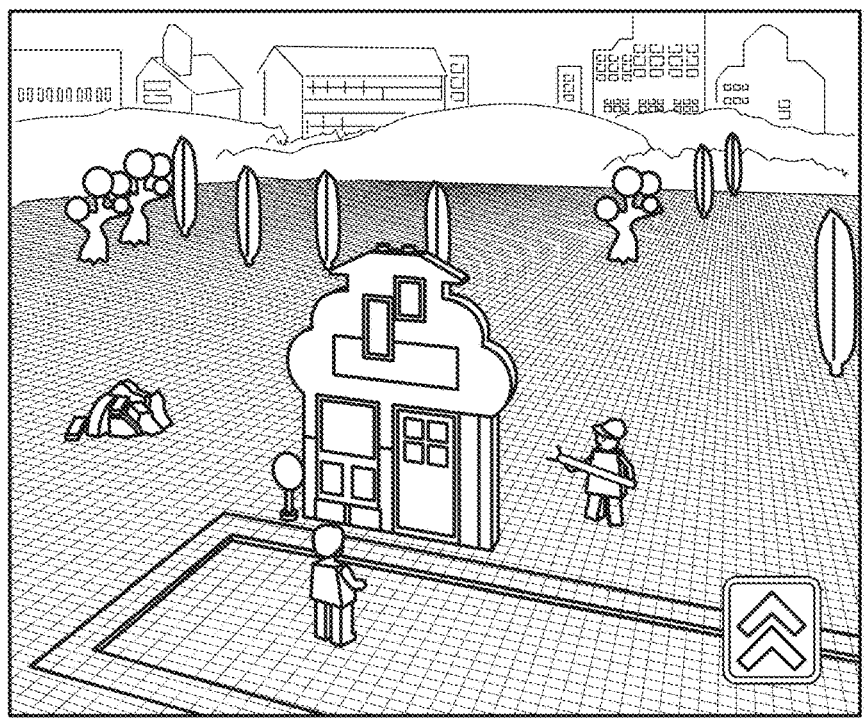
Figure 14G:
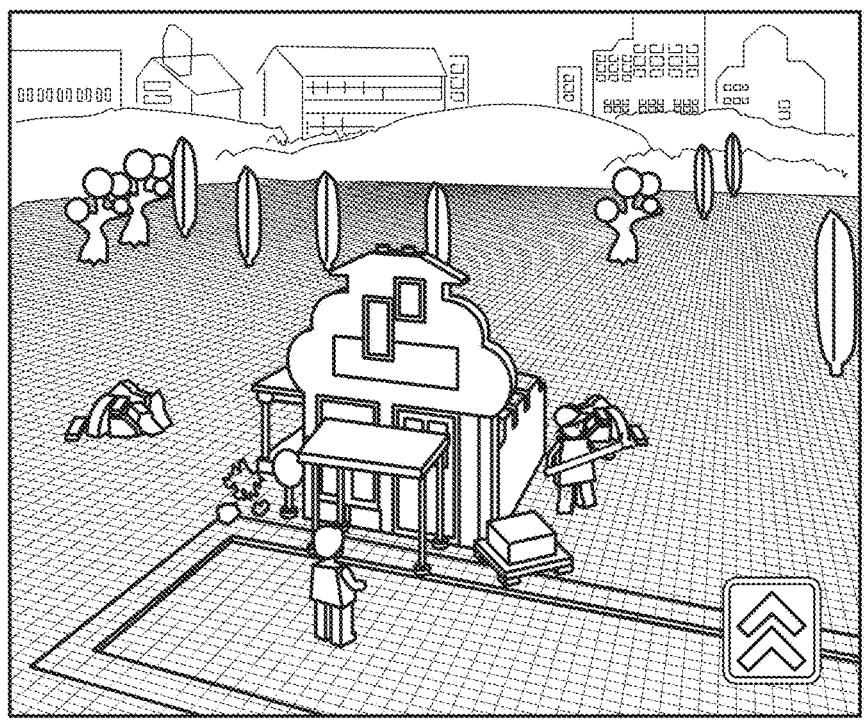

In a subsequent step the process displays the 3D graphical representation of the virtual object at the selected position. In the example of FIGS. 14F-G, the creation of the 3D virtual object is presented as an animated virtual construction process where the 3D object is created step by step from virtual construction elements. To this end, the process may create a data structure of a 3D virtual construction model comprising a plurality of interconnected virtual construction element positioned so as to form a 3D virtual model where one side view of the 3D virtual model matches the extracted 2D view and the remaining sides form a simulated extruded circumferential surface matching the periphery of the 2D view.

Figure 14H:
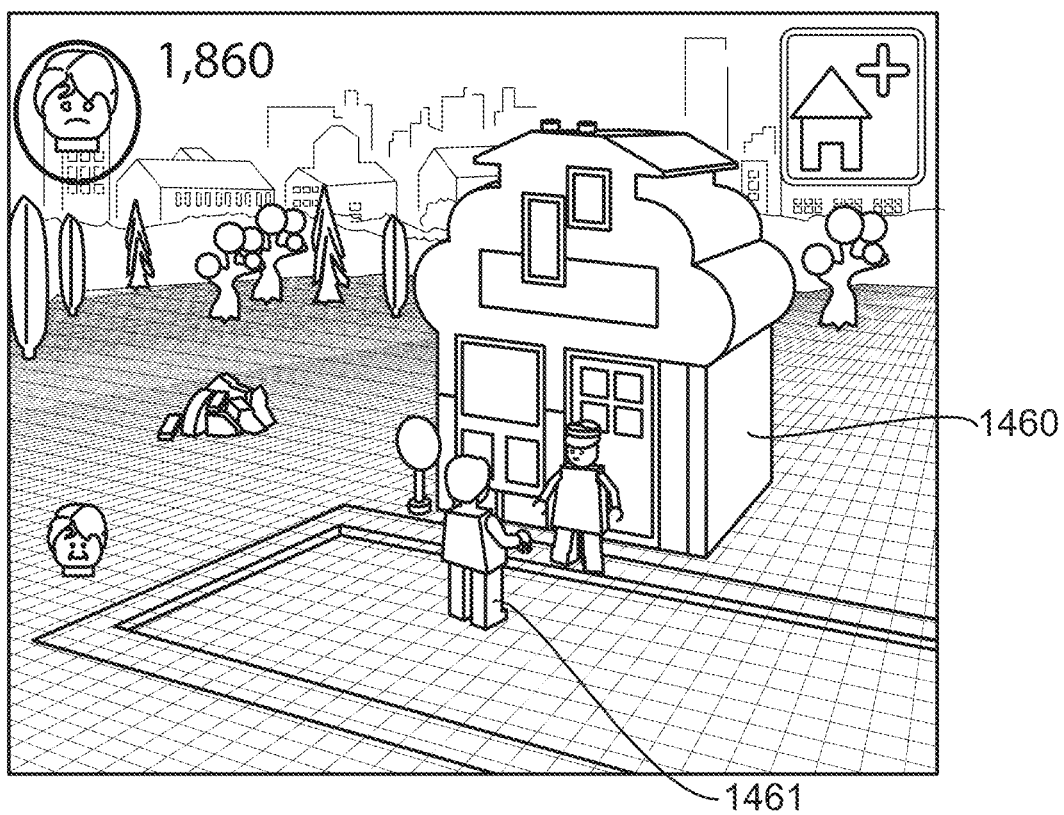

Finally, the newly added virtual object, represented as a 3D graphical representation 1460, is modelled as part of the virtual environment with which virtual characters 1461 may interact, e.g. enter the building through a door, look out a window, climb in or out of a window, etc. e.g. as illustrated by FIG. 14H.

Figure 15:
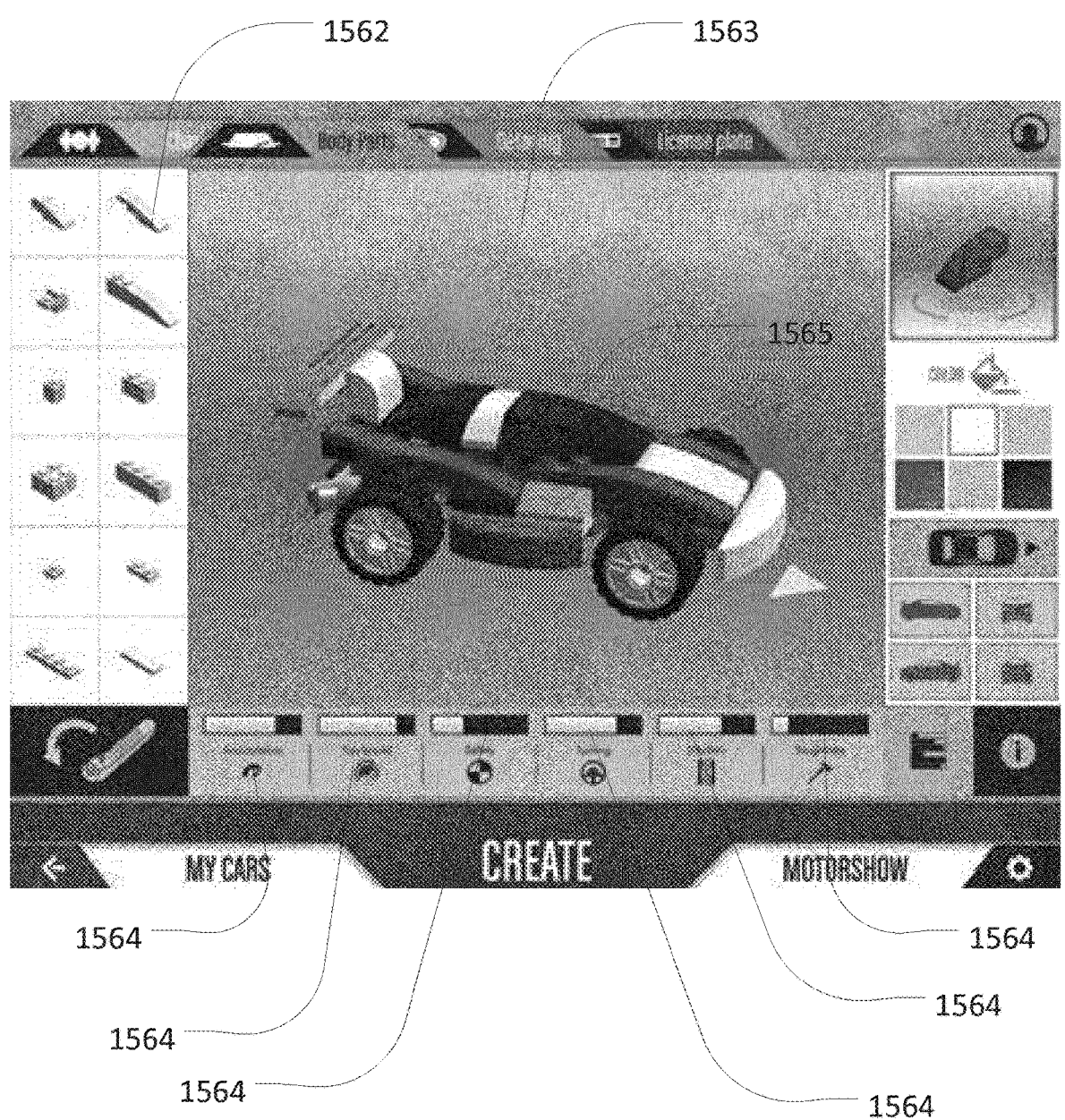
FIG. 15 illustrates an exemplary user interface that allows a user to select a virtual construction element from a list of construction elements, represented graphically in an element selection area, also referred to as palette.

FIG. 15 illustrates an exemplary user interface that allows a user to construct a virtual construction model from virtual construction elements, resulting in a digital representation of a virtual construction model. The user interface allows a user to select a virtual construction element from a selection area, in this example a list of construction elements, represented graphically in an element selection area 1562, also referred to as palette. The user interface may be provided on a display of a user system, such as a suitably programmed computer or other data processing system. Using an input device of the user system (e.g., mouse, keyboard, trackball, touch screen, etc.) the user can select virtual construction elements from the palette 1562 and assemble a virtual construction model 1565 in a virtual building area 1563. An exemplary process and user interface for placing and assembling virtual construction elements in a 3D scene is described in WO 2004/104811, the entire contents of which are incorporated herein by reference. The element selection area 1562 may be divided into a number of different sub-palettes, each sub-palette including different types of elements, thereby making it easier for a user to identify any desired element. The process may establish and maintain a data structure representing the virtual construction model 1565 and the data structure may comprise connectivity information e.g. using techniques such as those described in WO 2004/034333, the entire contents of which are incorporated herein by reference. The constructed model may subsequently be used as a virtual object in a virtual environment where the system implementing the virtual environment may set virtual attributes of the created virtual object based on one or more visible characteristics of the constructed model. Accordingly, the user interface of the construction environment may display current values of one or more virtual attributes 1564 of the virtual object, if the virtual object is created based on the virtual construction model 1565 in its currently displayed form. Whenever the user adds a new construction element to the model, removes a construction element from the model or repositions one of the construction elements, the system may re-compute the virtual attributes and display the updated values. Consequently, the user may easily monitor the consequences of the building activities on the attributes of the resulting virtual object or character.

To this end, each virtual construction element may have associated with it certain attributes, such as a colour, a weight or volume, and the process may determine a total weight or volume of the model or a dominant colour, and/or similar characteristics of the model from the corresponding characteristics of the individual construction elements. Moreover, the process may determine other visible attributes of the model, such as an aspect ratio, the relative size of certain parts of the model, a measure of connectedness, etc.

In the example of FIG. the model 1565 is a racing car which may subsequently be used in a virtual car racing game. The attributes of a car in the racing game may include one or more of the following: acceleration, top speed, safety, handling, traction, toughness. These and/or other attributes may determine how the virtual car in the racing game responds to user inputs and/or interactions with other cars or the environment.

The above attributes may, at least in part, be determined by visible attributes of the virtual construction model 1565. For example, the total weight or volume of the model may have a strong negative impact on the acceleration of the car and a small negative impact on the top speed and the handling of the car. Similarly the total volume or weight may have a strong positive impact on the safety and the traction of the car and a small positive impact on the toughness. The impact of each characteristics may e.g. be modelled by the following equation: $A=A0+w \cdot C$, where $A$ is the virtual attribute (e.g. total speed) $A0$ is a base value of the attribute before the characteristic is taken into account, $C$ is a characteristic influencing the attribute $A$ (e.g. the total volume of the model), and $w$ is a weight factor, where a negative weight factor corresponds to negative impact and a positive weight factor corresponds to positive impact.

Other examples of characteristics of the model 1565 that influence the virtual attributes of a virtual car in a car racing game include the shape of the model, e.g. a sloping angle of a frontal area (which is a measure of the aerodynamics of the virtual car), the number of virtual connection members interconnecting respective virtual construction elements in the model (which may have positive impact on parameters such as toughness, safety, handling, etc.), the size of the wheels, the (dominant) colour of the model, the presence of specific types of construction elements, e.g. elements representing certain engine parts, spoilers, etc.

Generally, in an alternative embodiment, the system may present the selectable toy construction elements in the selection area in a different manner. For example, the virtual construction elements in the selection area may be displayed as a simulated heap of arbitrarily positioned virtual construction elements. The user interface may then provide functionality allowing a user to select a virtual construction element from the simulated heap and to reposition the selected construction element within the selection area. The selection area may be a display area separate from the building area or combined with the building area. For example the elements in the simulated heap may surround the constructed model. Generally, the individual virtual construction elements in the heap may each be modelled as a solid object having a predetermined weight. Movement of one of the virtual element responsive to a user interaction, e.g. by clicking on the element with a mouse or by touching its representation on a touchscreen, may be modelled using a physics simulation engine. The physics simulation engine may be configured to model the movements of the virtual construction elements in the heap under a simulated gravity and responsive to a simulated force imparted on one of the elements by a user interaction and responsive to collisions of virtual elements with each other.

Selection of a virtual construction element from the heap may be implemented in a number of different ways, e.g. by dragging an element from the selection area to the building area, by double clicking/tabbing on the selected element, and/or the like.

Embodiments of the method described herein can be implemented by means of hardware comprising several distinct elements, and/or at least in part by means of a suitably programmed microprocessor.

In the claims enumerating several means, several of these means can be embodied by one and the same element, component or item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, elements, steps or components but does not preclude the presence or addition of one or more other features, elements, steps, components or groups thereof.

The invention claimed is:

1. A computer-implemented method of manipulating a three-dimensional virtual construction model assembled from a plurality of virtual construction elements, the method comprising:
   displaying a representation of a virtual construction model on a display;
   displaying a plurality of virtual construction elements as a simulated heap of arbitrarily positioned virtual construction elements and computing a virtual attribute of a virtual object represented by the virtual construction model; and
   allowing a user to select one or more virtual construction elements and to add the selected virtual construction element to the virtual construction model;
   wherein the virtual construction elements are only positionable in a discrete number of relative positions and/or orientations with respect to each other and/or be interconnected with each other at predetermined connection points;
   wherein allowing a user to select one or more virtual construction elements comprises allowing a user to select a virtual construction element from the simulated heap and to reposition the selected construction element within a selection area, wherein repositioning a virtual construction element is not restricted by construction rules of the virtual construction elements in the virtual construction model; and
   wherein the method further comprises modelling movements of the virtual construction elements in the heap under a simulated gravity and responsive to a simulated force imparted on one of the virtual construction elements by a user interaction and responsive to collisions of virtual elements with each other.

2. The method according to claim 1, wherein the virtual construction model and the plurality of virtual construction elements are presented in a virtual environment.

3. The method according to claim 2, wherein the virtual attribute of the virtual object is associated with a behavioural characteristic of the virtual object, and wherein the virtual attribute has a value based on one or more determined visual attribute parameters.

4. The method according to claim 3, wherein the virtual attribute is indicative of one of:
   a speed of movement of the virtual object in the virtual environment;
   a behavioural pattern of an at least partly autonomous virtual object; and
   a need or preference of the at least partly autonomous virtual object.

5. The method according to claim 3, wherein the virtual object is configured to interact with the virtual environment based on the one or more determined visual attribute parameters.

6. The method according to claim 3, further comprising detecting a presence of one or more visual features of the virtual construction model.

7. The method according to claim 2, further comprising dynamically re-computing the virtual attribute responsive to adding one of the plurality of virtual construction elements to the virtual construction model.

8. The method according to claim 2, wherein:
   the virtual attribute of the virtual object is associated with a behavior of the virtual object, wherein the behavior is controllable by one or more behaviour simulation rules.

9. The method according to claim 1, wherein each of the plurality of virtual construction elements comprises a top surface, a bottom surface, and coupling members placed on at least one of the top and the bottom surfaces.

10. A data processing system comprising computer program code configured to cause, when the computer program code is executed by the data processing system, the data processing system to perform the steps of the method defined in claim 1.

11. A computer program product comprising computer program code configured to cause, when executed by a data processing system, the data processing system to perform the steps of the method defined in claim 1.

* * * * *